(12) United States Patent
Kanada et al.

(10) Patent No.: US 7,003,578 B2
(45) Date of Patent: Feb. 21, 2006

(54) METHOD AND SYSTEM FOR CONTROLLING A POLICY-BASED NETWORK

(75) Inventors: Yasusi Kanada, Tokyo (JP); Brian J. O'Keefe, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 689 days.

(21) Appl. No.: 09/842,130

(22) Filed: Apr. 26, 2001

(65) Prior Publication Data

US 2002/0194317 A1    Dec. 19, 2002

(51) Int. Cl.
G06F 15/16    (2006.01)
(52) U.S. Cl. ............... 709/230; 709/223; 709/224; 709/225; 709/230
(58) Field of Classification Search ............... 709/220, 709/221, 223, 224, 203, 225, 230
See application file for complete search history.

(56) References Cited

U.S. PATENT DOCUMENTS

| | | | |
|---|---|---|---|
| 5,555,346 A | | 9/1996 | Gross et al. |
| 5,797,128 A | * | 8/1998 | Birnbaum ............... 711/163 |
| 5,812,819 A | | 9/1998 | Rodwin et al. |
| 5,870,561 A | | 2/1999 | Jarvis et al. |
| 5,889,953 A | | 3/1999 | Thebaut et al. |
| 6,021,438 A | | 2/2000 | Duvvoori et al. |
| 6,041,347 A | | 3/2000 | Harsham et al. |
| 6,064,656 A | | 5/2000 | Angal et al. |
| 6,105,027 A | | 8/2000 | Schneider et al. |
| 6,158,010 A | | 12/2000 | Moriconi et al. |
| 6,167,445 A | | 12/2000 | Gai et al. |
| 6,233,686 B1 | | 5/2001 | Zenehelsky et al. |
| 6,237,036 B1 | | 5/2001 | Ueno et al. |
| 6,286,038 B1 | * | 9/2001 | Reichmeyer et al. ....... 709/220 |
| 6,463,470 B1 | * | 10/2002 | Mohaban et al. ........... 709/223 |
| 6,473,851 B1 | * | 10/2002 | Plutowski ..................... 713/1 |
| 6,539,425 B1 | * | 3/2003 | Stevens et al. .............. 709/220 |
| 6,601,082 B1 | * | 7/2003 | Durham et al. ............. 709/223 |
| 6,611,863 B1 | * | 8/2003 | Banginwar ................... 709/220 |
| 6,621,505 B1 | * | 9/2003 | Beauchamp et al. ........ 715/764 |
| 6,718,380 B1 | * | 4/2004 | Mohaban et al. ........... 709/223 |
| 6,865,185 B1 | * | 3/2005 | Patel et al. .................. 370/412 |
| 2001/0039576 A1 | * | 11/2001 | Kanada ....................... 709/223 |
| 2003/0115246 A1 | * | 6/2003 | Mahon et al. ............... 709/200 |

FOREIGN PATENT DOCUMENTS

WO    WO 96/2134    11/1996

OTHER PUBLICATIONS

Stardust.com, Inc., Introduction to QoS Policies (Jul. 1999), (visited Feb. 21, 2001) <http://www.stardust.com/policy/whitepapers/qospol.htm/>.

(Continued)

*Primary Examiner*—David Wiley
*Assistant Examiner*—Phuoc H. Nguyen

(57) ABSTRACT

A method and system are described for controlling a policy-based network. According to an exemplary embodiment of the present invention, a first policy is established within a policy server of the network, wherein the first policy includes at least a first function and a second function. The first policy is converted into at least a second policy and a third policy, wherein the second policy is associated with the first function and the third policy is associated with the second function. The second policy and the third policy are distributed within the network to at least one node. The at least one node is controlled using the second policy and the third policy.

14 Claims, 21 Drawing Sheets

OTHER PUBLICATIONS

Internet Draft, Internet, Engineering Task Force, An Architecture for Differentiated Services (Dec. 1998), (visited Feb. 21, 2001) <http://www.ietf.org/>.

Internet Draft, Internet Engineering Task Force, An Expedited Forwarding PHB (Jun. 1999), (visited Feb. 21, 2001) <http://www.ietf.org/>.

U.S. Appl. No. 09/382,176, filed Aug. 24, 1999, Fredrick Roeling.

U.S. Appl. No. 09/382,171, filed Aug. 24, 1999, Hugh F. Mahon et al.

U.S. Appl. No. 09/382,172, filed Aug. 24, 1999, Hugh F. Mahon et al.

U.S. Appl. No. 09/382,059, filed Aug. 24, 1999, Hugh F. Mason et al.

U.S. Appl. No. 09/382,175, filed Aug. 24, 1999, Hugh F. Mahon et al.

U.S. Appl. No. 09/479,206, filed Jan. 7, 2000, Jason Goldman et al.

U.S. Appl. No. 09/479,205, filed Jan. 7, 2000, Jason Goldman et al.

Internet Draft, Internet Engineering Task Force, Assured Forwarding PHB Group (Jun. 1999), (visited Feb. 21, 2001) <http://www.ietf.org/>.

Internet Draft, Internet Engineering Task Force, A Two-bit Differentiated Services Architecture for the Internet (Jul. 1999), (visited Feb. 21, 2001) <http://www.ietf.org/>.

Internet Draft, Internet Engineering Task Force, SNMP-based QoS Programming Interface MIB for Routers (Oct. 1999), (visited Feb. 21, 2001) <http://www.kanadas.com/activenet/index.html/>.

Yasusi Kanada, Two Rule-based Building-block Architectures for Policy-based Network Control, 2nd International Working Conference on Active Networks (IWAN 2000), Oct. 2000.

* cited by examiner

| ADDR | SOURCE IP MIN | SOURCE IP MAX | SOURCE IP PORT | DEST IP MIN | DEST IP MAX | DEST IP PORT | DSCP | INFO. RATE | IN QUEUE | OUT DSCP | OUT QUEUE | OUT DROP |
|---|---|---|---|---|---|---|---|---|---|---|---|---|
| 300 | 192.168.6.0 | 192.168.6.255 | - | 0.0.0.0 | 255.255.255.255 | - | 18 | - | 5 | - | - | - |
| 332 | 0.0.0.0 | 255.255.255.255 | - | 0.0.0.0 | 255.255.255.255 | - | 46 | 1000 | 6 | - | - | DROP |
| 364 | 192.168.7.2 | 192.168.7.2 | - | 0.0.0.0 | 255.255.255.255 | - | 10 | - | 5 | - | - | - |
| 396 | 192.168.7.4 | 192.168.7.4 | - | 0.0.0.0 | 255.255.255.255 | - | 10 | - | 5 | - | - | - |
| 428 | 0.0.0.0 | 255.255.255.255 | - | 0.0.0.0 | 255.255.255.255 | - | - | - | 2 | - | - | - |
| ↑1341 | ↑1342 | ↑1343 | ↑1344 | ↑1345 | ↑1346 | ↑1347 | ↑1348 | ↑1349 | ↑1350 | ↑1351 | ↑1352 | |

(1316 ↓ pointer above SOURCE IP MIN column)

| | | | |
|---|---|---|---|
| DSCP | 10 | SCHEDULING_ALGORITHM = "PRIORITY"; QUEUE_PRIORITY = 5; | ~1801 |
| DSCP | 18 | SCHEDULING_ALGORITHM = "PRIORITY"; QUEUE_PRIORITY = 5; | ~1802 |
| DSCP | 46 | SCHEDULING_ALGORITHM = "PRIORITY"; QUEUE_PRIORITY = 6; | ~1803 |
| DSCP | - | SCHEDULING_ALGORITHM = "PRIORITY"; QUEUE_PRIORITY = 2; | ~1804 |

FIG. 18

METHOD AND SYSTEM FOR CONTROLLING A POLICY-BASED NETWORK

BACKGROUND

1. Field of the Invention

The present invention relates to computer networks. More particularly, the present invention relates to computer networks that can be controlled using policies.

2. Background Information

In a network system that does not employ policy-based control, network devices are configured separately one by one for controlling the functions for the Quality of Service (QoS) and security management.

A high-speed network device can comprise hardware for performing high-speed processing. Furthermore, an increasing number of network devices recently introduced into the market include built-in processors called packet processors or network processors capable of high-speed processing of limited functions. However, these hardware network devices are not for general purpose use, so their functionality is limited to a certain extent. Consequently, these network devices are not necessarily capable of using policies to control their behavior.

Differentiated Services Technology ("DiffServ") is one system for controlling a network. DiffServ assures QoS over a network, such as the Internet. According to DiffServ technology, a series of packets are transmitted between a first network application to a second network application via a network, each of these packets being viewed as one that belongs to a single "flow" or a flow of packets. Whether or not a given Internet Protocol (IP) packet belongs to a given flow may be determined by identifying the source and/or IP addresses, the protocol, and if that protocol is either TCP or UDP, also by identifying the ports thereof. On the path from the first network application to the second network application, there are an edge router as an entrance to the network, zero or more core routers, and then an edge router as an exit from the network.

According to DiffServ technology, a plurality of flows are brought together and the packets are marked with a given value in their DS field (Differentiated Services field) at the entrance edge router, and those packets having that given value are thereafter handled as the components of a single flow (aggregated flow). The value included in the DS field is called a DSCP (Differentiated Services Code Point). By creating aggregated flows, the QoS conditions such as a bandwidth and packet transmission priority may be controlled for each of the aggregated flows just by determining the DSCP. By using this DiffServ technology, flows may be aggregated, allowing the determination to be made only by the DSCP so that the load on core routers for managing the QoS conditions may be alleviated.

However, a need may arise for rules included in a single high-level policy to be divided into rules of a plurality of low-level policies implementing the equivalent functions, or for rules included in a plurality of high-level policies to be merged into rules of a single low-level policy implementing the equivalent functions. Furthermore, due to the constraint of the hardware functions, the policy rules themselves also may not be converted through a one-to-one correspondence. That is, there may be a case in which a single policy rule in a high-level policy needs to be converted into a plurality of policy rules of a low-level policy implementing the equivalent function, or a plurality of policy rules in a high-level policy has to be converted into a single policy rule included in a low-level policy implementing the equivalent function.

It would be desirable to provide a policy-controlled network system which allows a single high-level policy to be converted into a plurality of low-level policies that meet the constraints of the device, even if the high-level policy cannot be converted through a one-to-one correspondence due to the constraints over the low-level policies of the network device, and which allows a plurality of high-level policies to be converted into a single low-level policy that meets the constraint of the network device even if the high-level policies may not be converted through a one-to-one correspondence due to the constraint.

SUMMARY OF THE INVENTION

A method and system are described for controlling a policy-based network. According to an exemplary embodiment of the present invention, a first policy is established within a policy server of the network, wherein the first policy includes at least a first function and a second function. The first policy is converted into at least a second policy and a third policy, wherein the second policy is associated with the first function and the third policy is associated with the second function. The second policy and the third policy are distributed within the network to at least one node. The at least one node is controlled using the second policy and the third policy.

In an exemplary embodiment of the present invention, at least a first policy and a second policy are established within a policy server of the network, wherein the first policy includes at least a first function and the second policy includes at least a second function. The first policy and the second policy are converted into a third policy, wherein the third policy is associated with the first function and the second function. The third policy is distributed within the network to at least one node. The at least one node is controlled using the third policy.

In an exemplary embodiment of the present invention, a system is described for controlling a policy-based network. The system can comprise a policy server for establishing policies. Conversion means convert at least one of a high-level policy into a plurality of low-level policies and a plurality of high-level policies into a low-level policy. Distributing means distribute within the network at least one of the low-level policy and the plurality of low-level-policies. A network node receives at least one of the low-level policy and the plurality of low-level-policies.

The use of the network policy conversion method and system of the present invention allows the conversion from a high-level policy (or policies) to a low-level policy (or policies), even when the high-level policy and the low-level policy do not have one-to-one correspondence. Although, in this conversion, the high-level policy to be converted would have a constraint, the introduction of a virtual flow label for the conversion solves this constraint, thereby enabling the conversion of a wide range of high-level policies.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

Figure 3A:
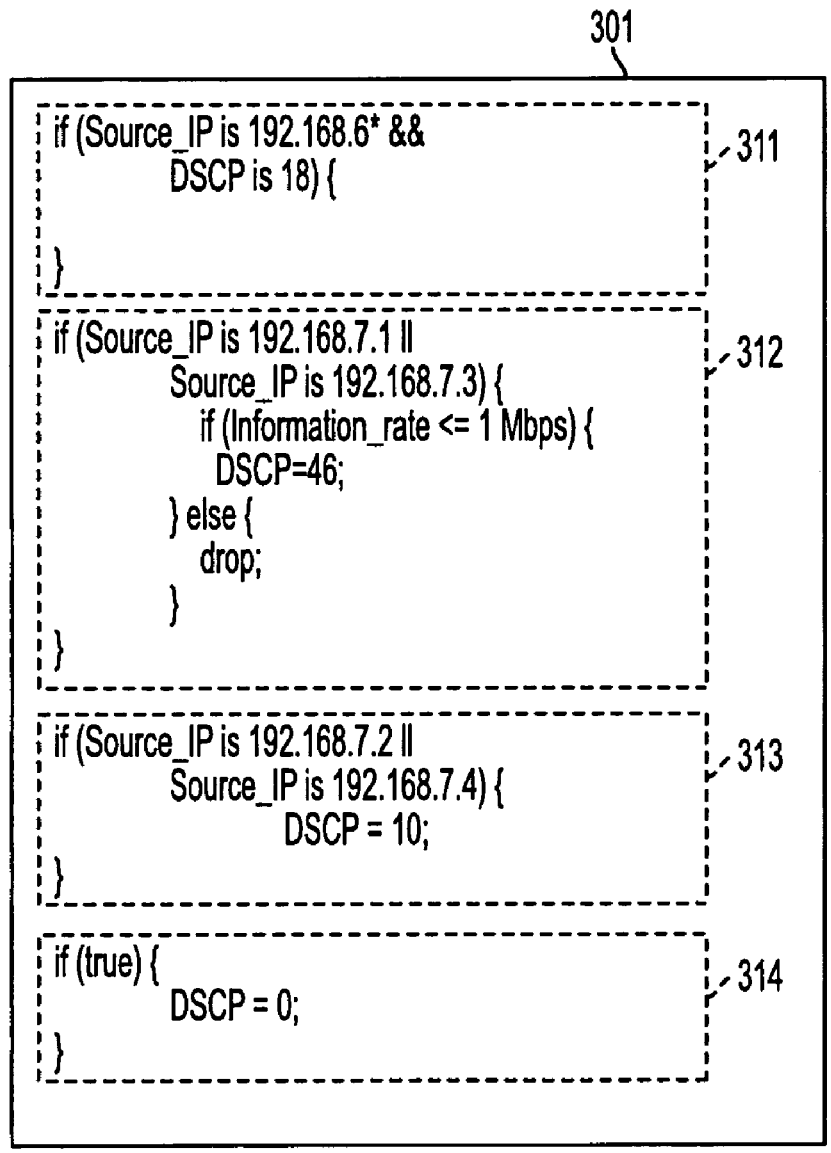
Figure 3B:
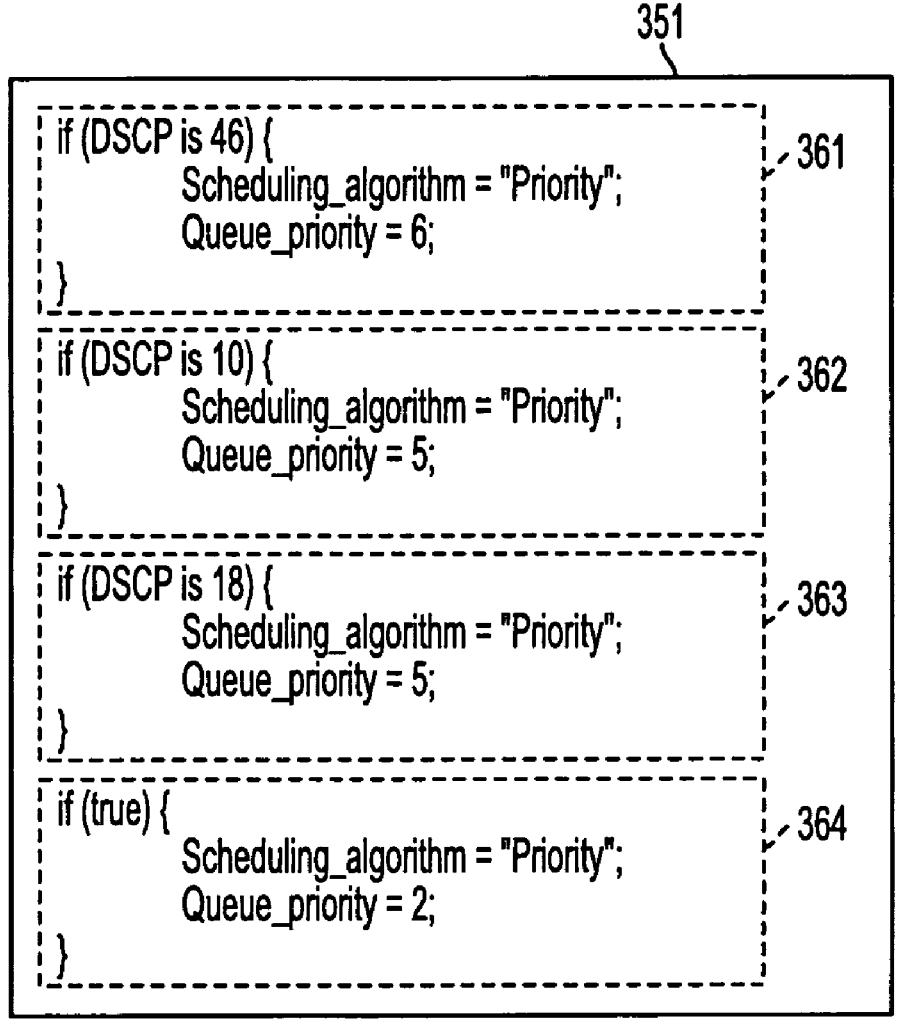

FIGS. 3(a) and 3(b) are diagrams illustrating an exemplary edge policy and an exemplary core policy, respectively, that are handled by the policy server.

Figure 2:
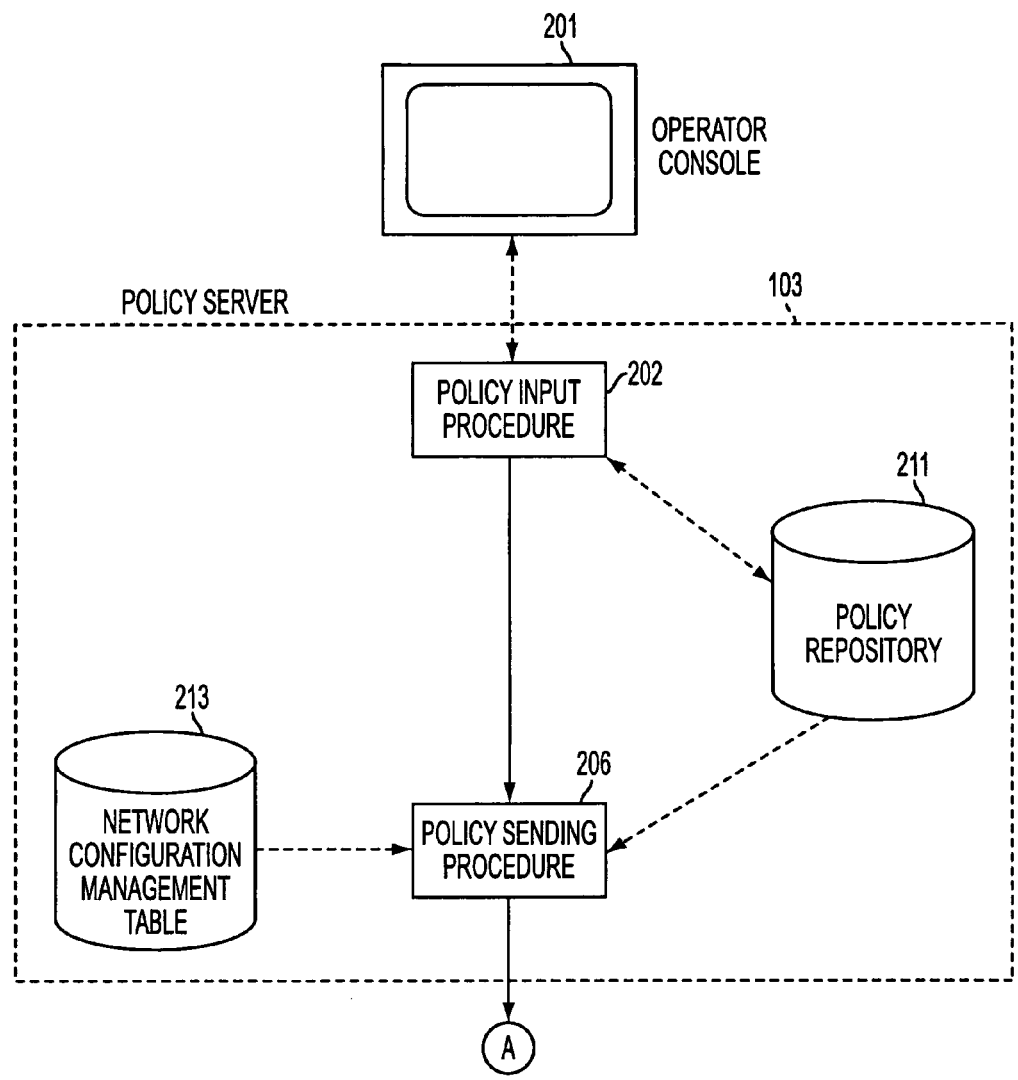
FIG. 2 is a schematic diagram of an exemplary embodiment of the policy server shown in FIG. 1.
Figure 4:
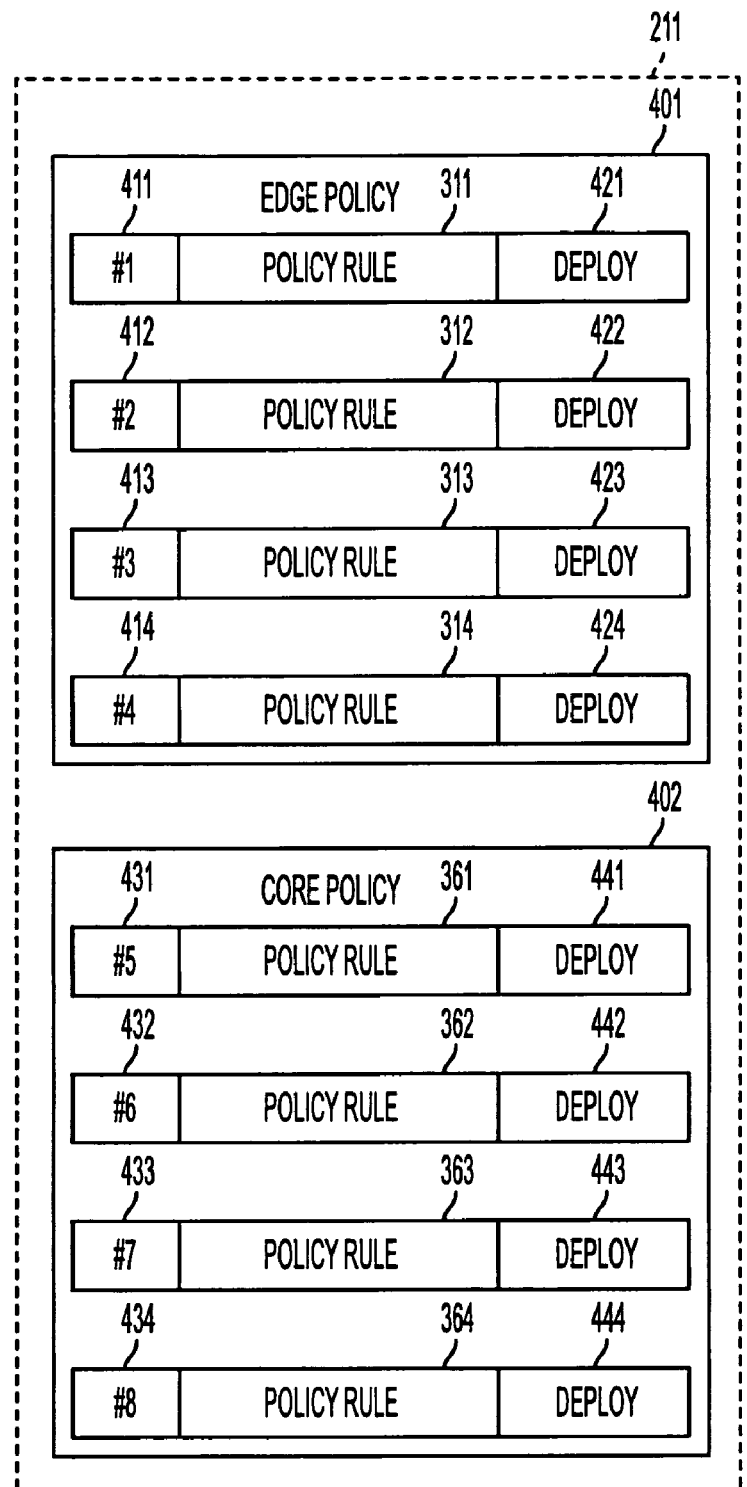

FIG. 4 is a diagram showing the content of an exemplary policy repository shown in FIG. 2.

Figure 5:
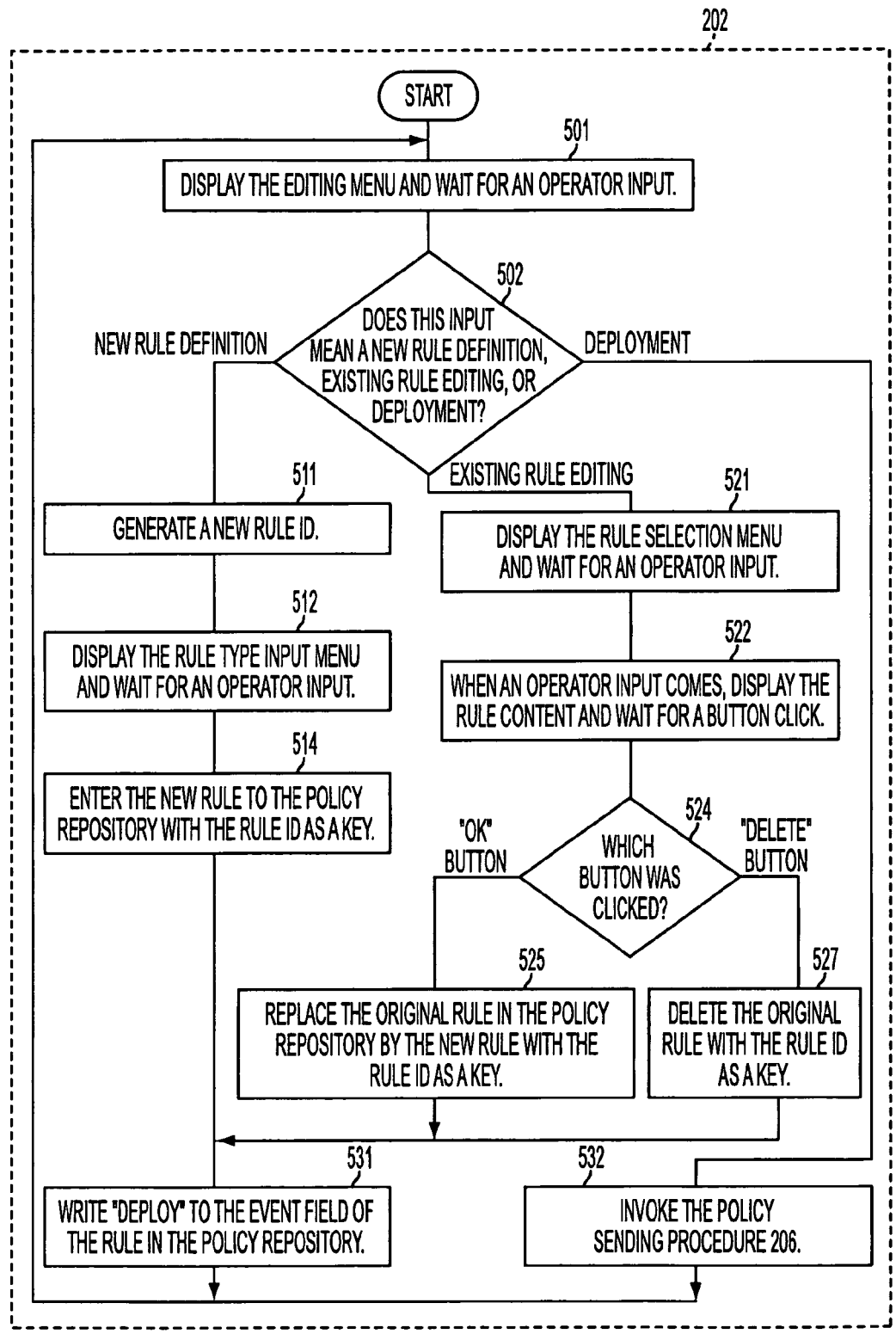

FIG. 5 is a flow diagram illustrating steps of an exemplary embodiment of the policy input procedure shown in FIG. 2.

Figure 6:
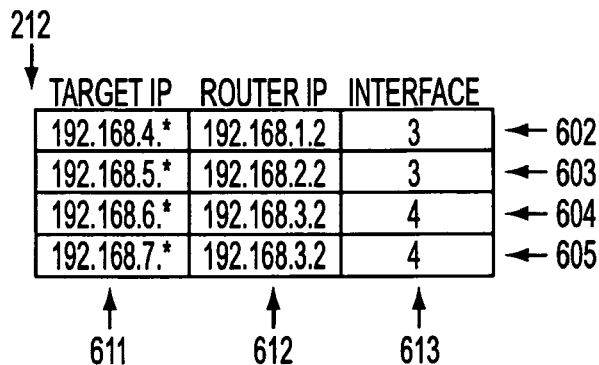

FIG. 6 is a diagram showing the content of an exemplary embodiment of a network configuration management table.

Figure 7:
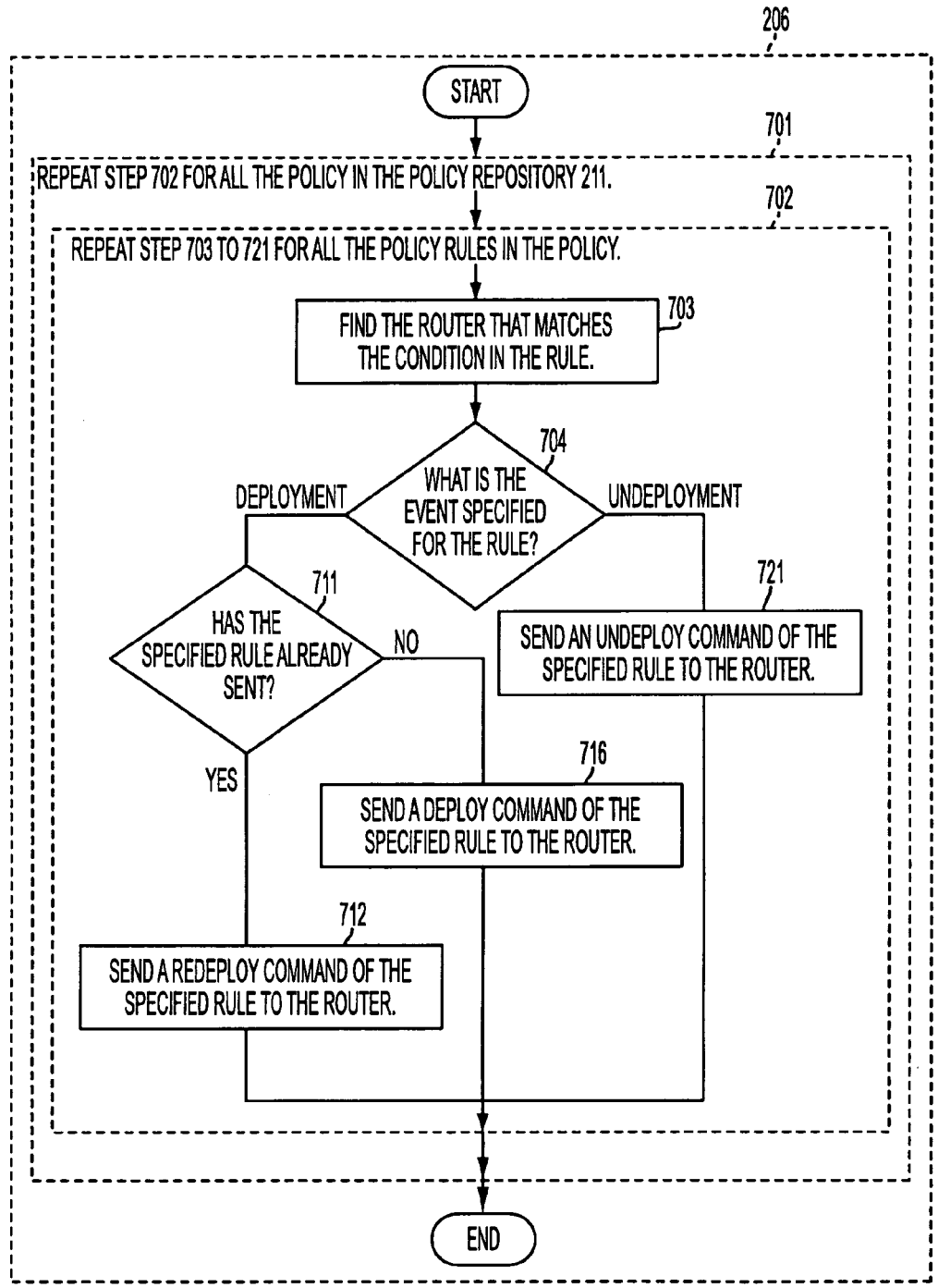

FIG. 7 is a flow diagram illustrating steps of an exemplary embodiment of the policy sending procedure shown in FIG. 2.

Figure 1:
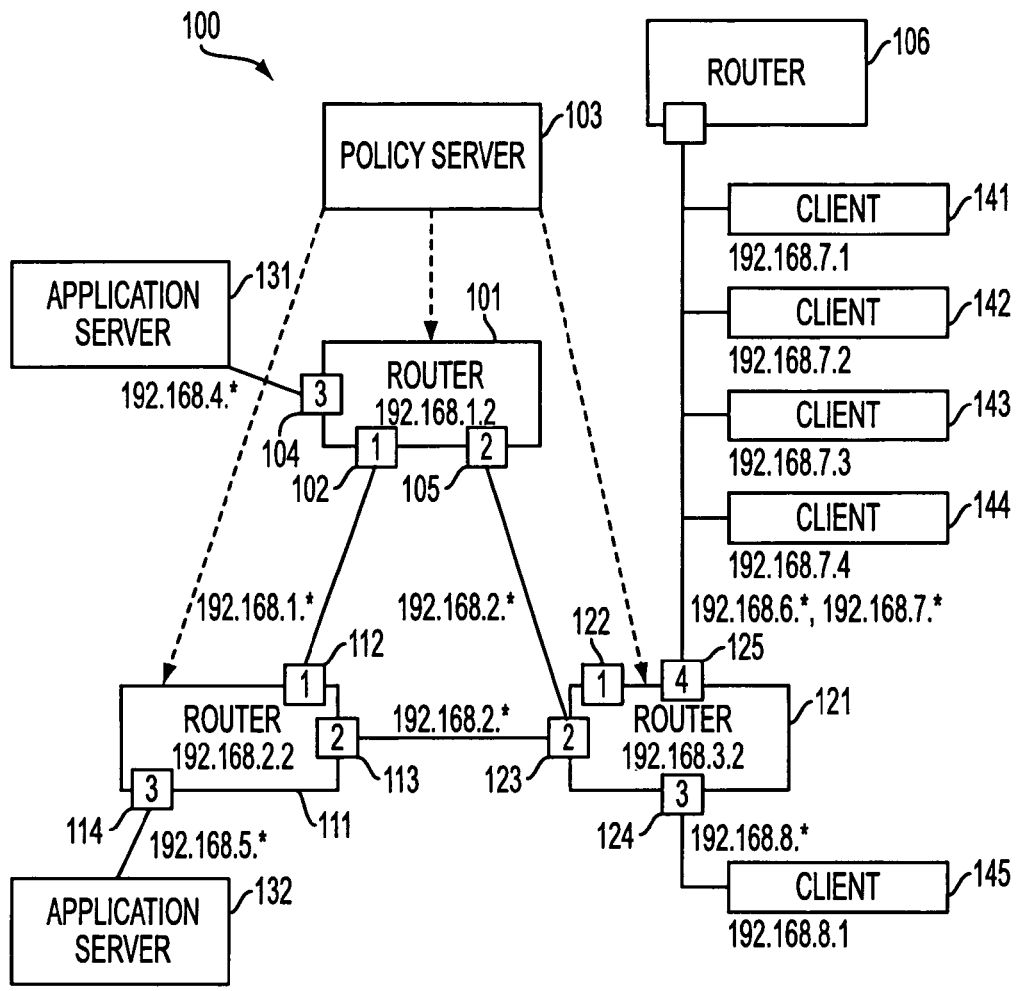
FIG. 1 is a network configuration diagram of an exemplary embodiment of the present invention.
Figure 8:
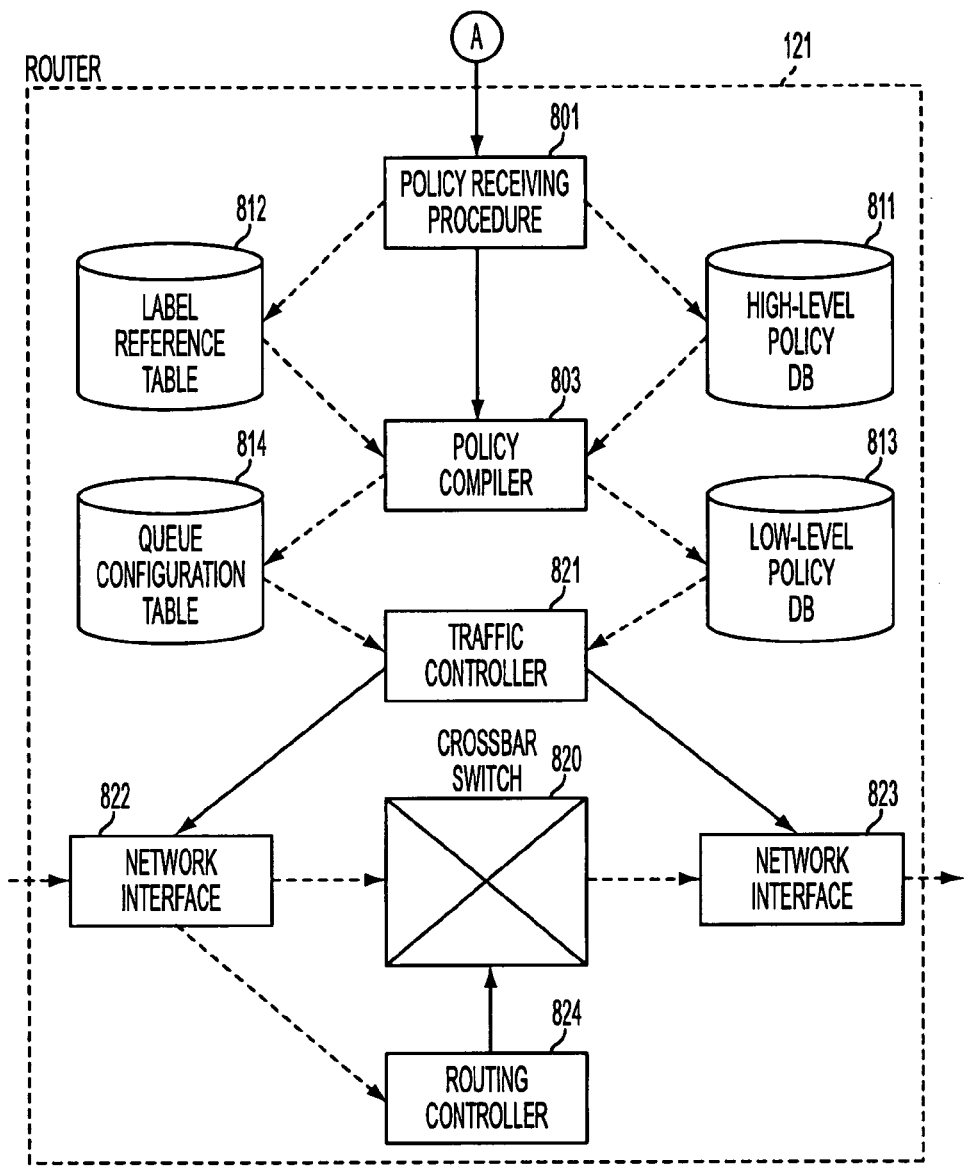

FIG. 8 is a schematic diagram of an exemplary embodiment of the router shown in FIG. 1.

Figure 9:
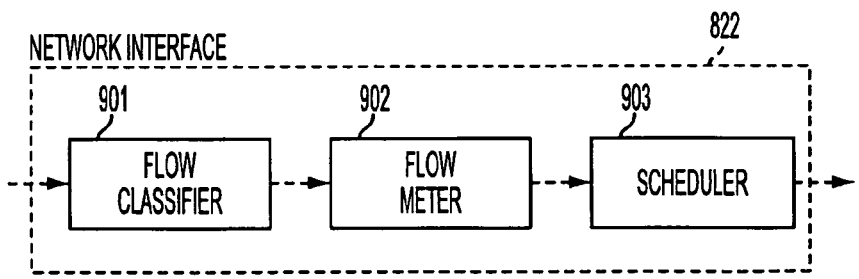

FIG. 9 is a schematic diagram of an exemplary embodiment of the network interface shown in FIG. 8.

Figure 10:
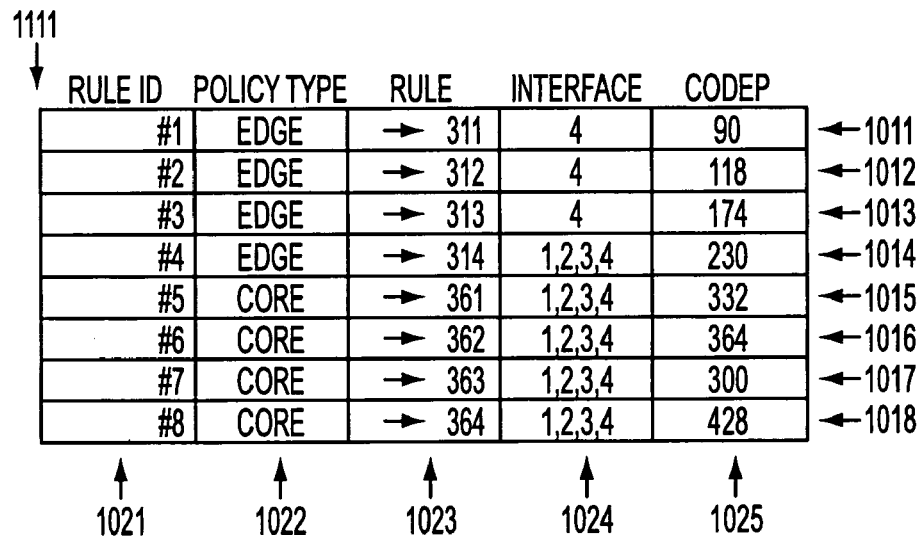

FIG. 10 is a diagram showing the content of an exemplary embodiment of the low-level policy database in FIG. 8.

Figure 11:
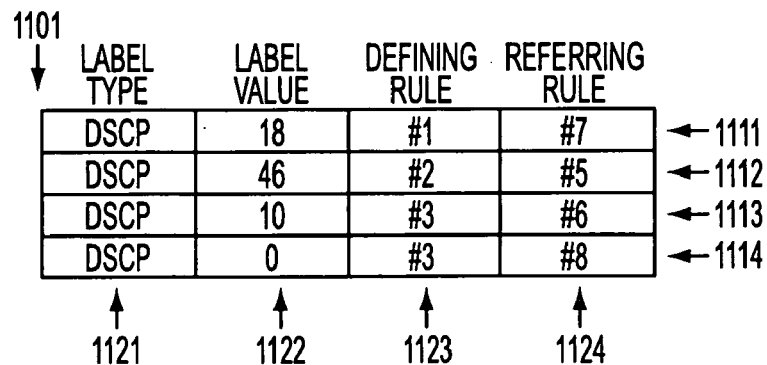

FIG. 11 is a diagram showing the content of an exemplary embodiment of the label reference table in FIG. 8.

Figure 12:
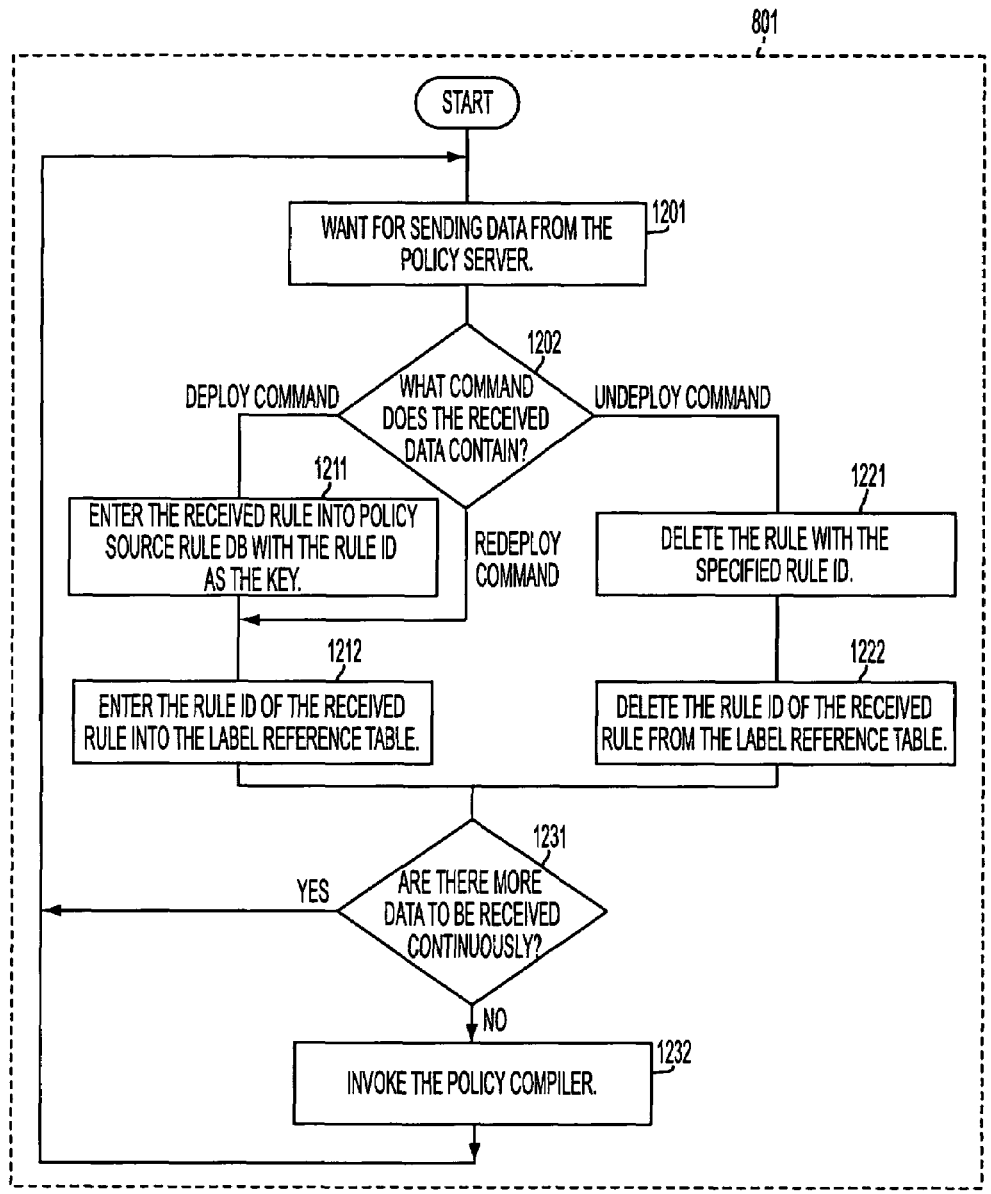

FIG. 12 is a flow diagram illustrating steps of an exemplary embodiment of the policy receiving procedure in FIG. 8.

Figure 13:
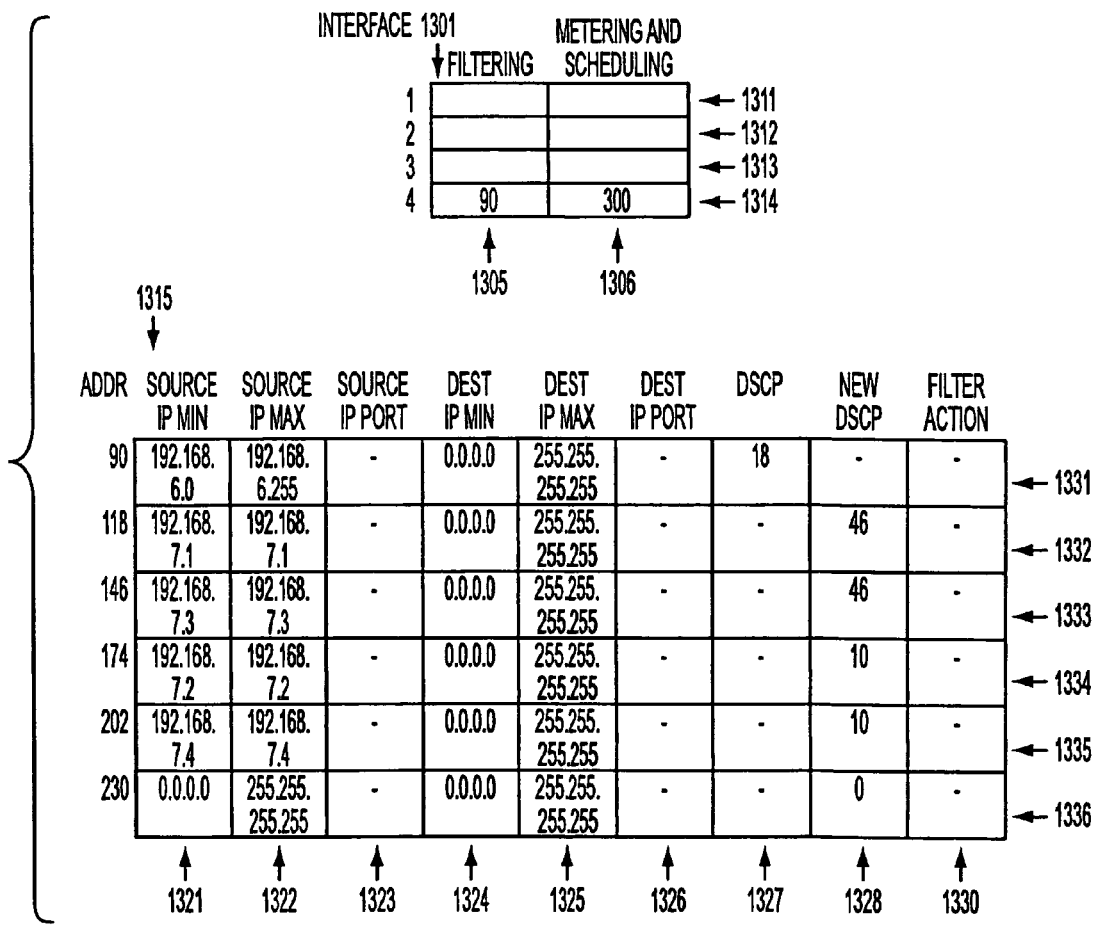
Figures 14, 15:
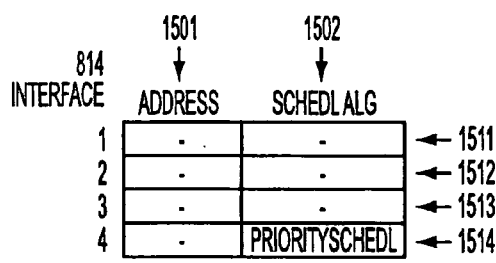

FIGS. 13 and 14 are diagrams showing the contents an exemplary embodiment of a policy rule table.

FIG. 15 is a diagram showing the content of an exemplary embodiment of the queue configuration table in FIG. 8.

Figure 16:
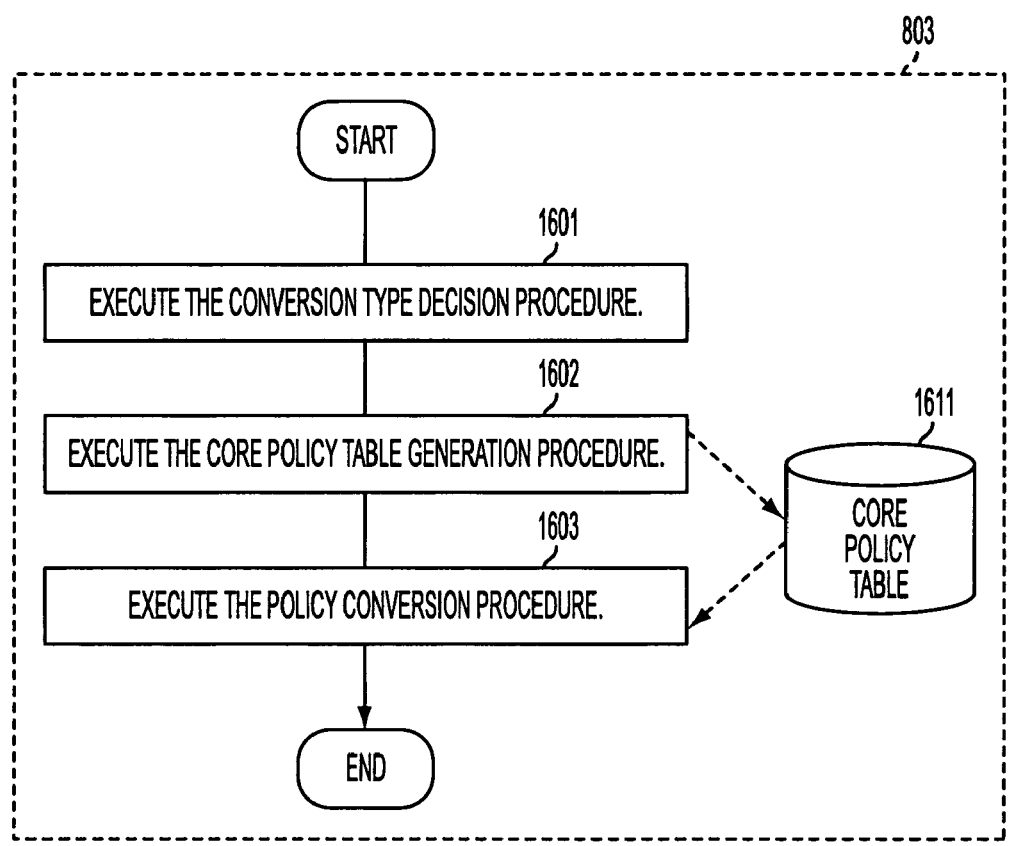

FIG. 16 is a flow diagram illustrating the processing steps of an exemplary embodiment of the policy compiler in FIG. 8.

Figure 17:
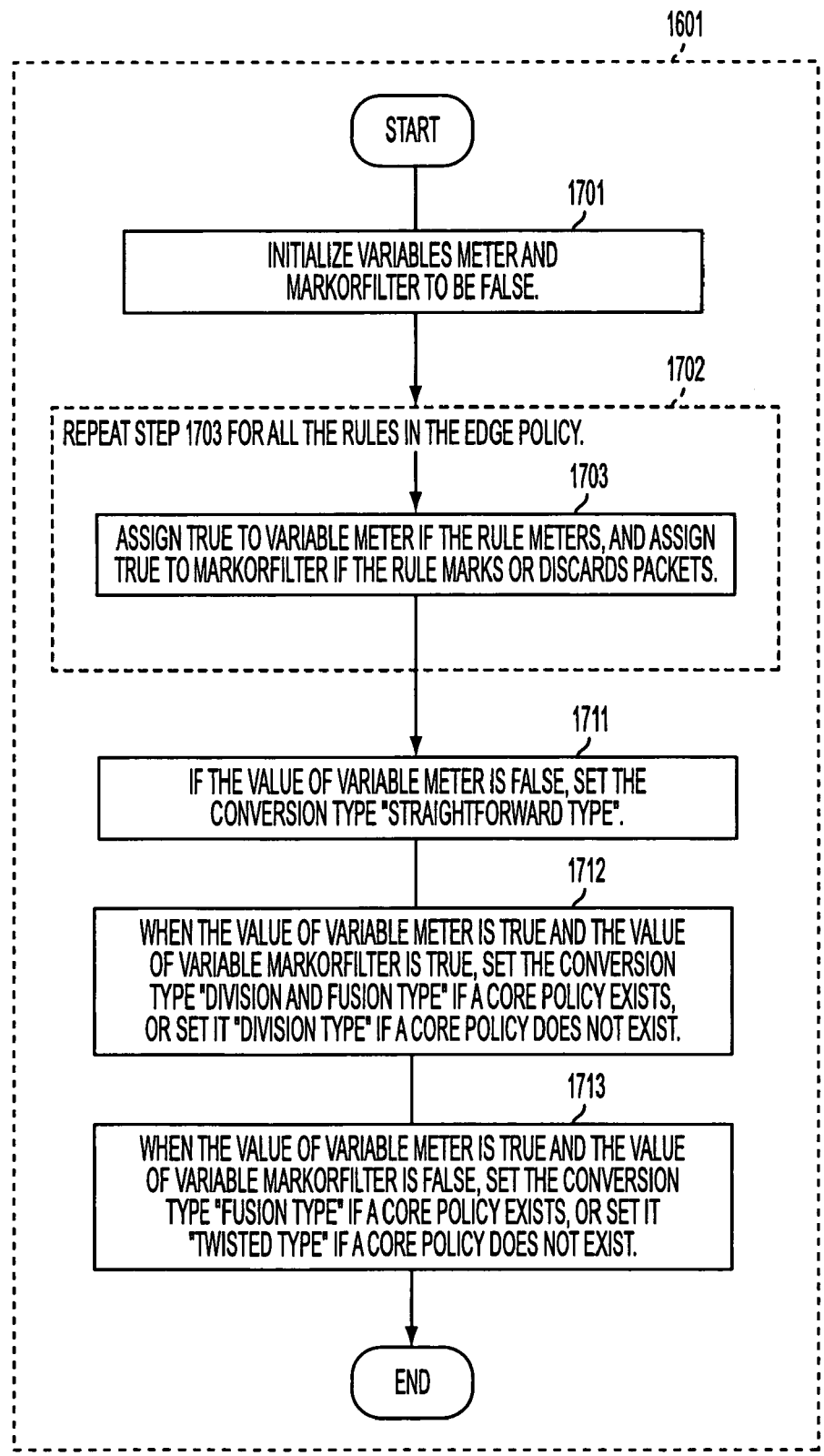

FIG. 17 is a flow diagram of the conversion type decision procedure of an exemplary embodiment of the policy compiler shown in FIG. 16.

FIG. 18 is a diagram showing the content of an exemplary embodiment of the core policy table in the policy compiler shown in FIG. 16.

Figure 19:
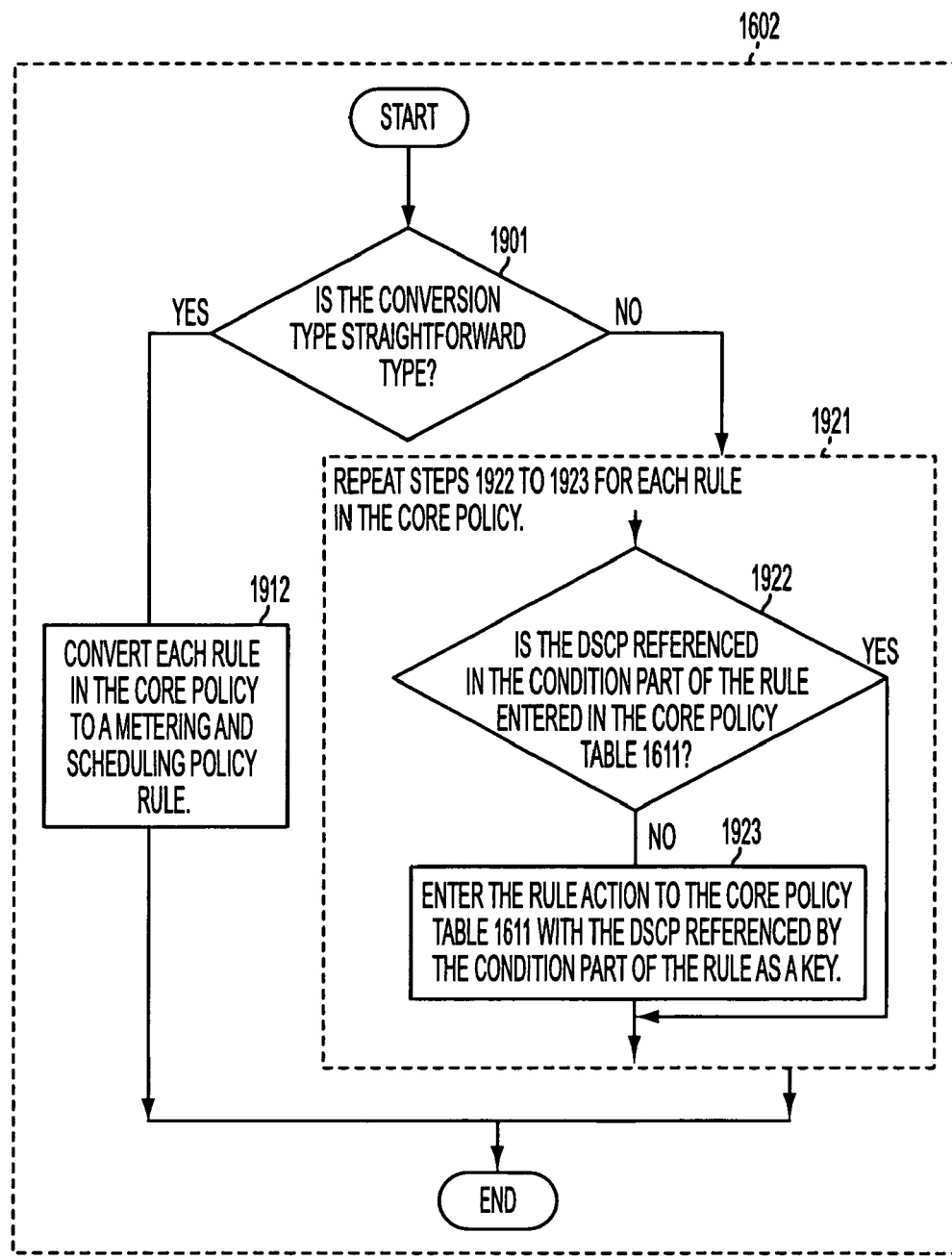

FIG. 19 is a flow diagram illustrating steps of an exemplary embodiment of the core policy table generation procedure of the policy compiler shown in FIG. 16.

Figure 20:
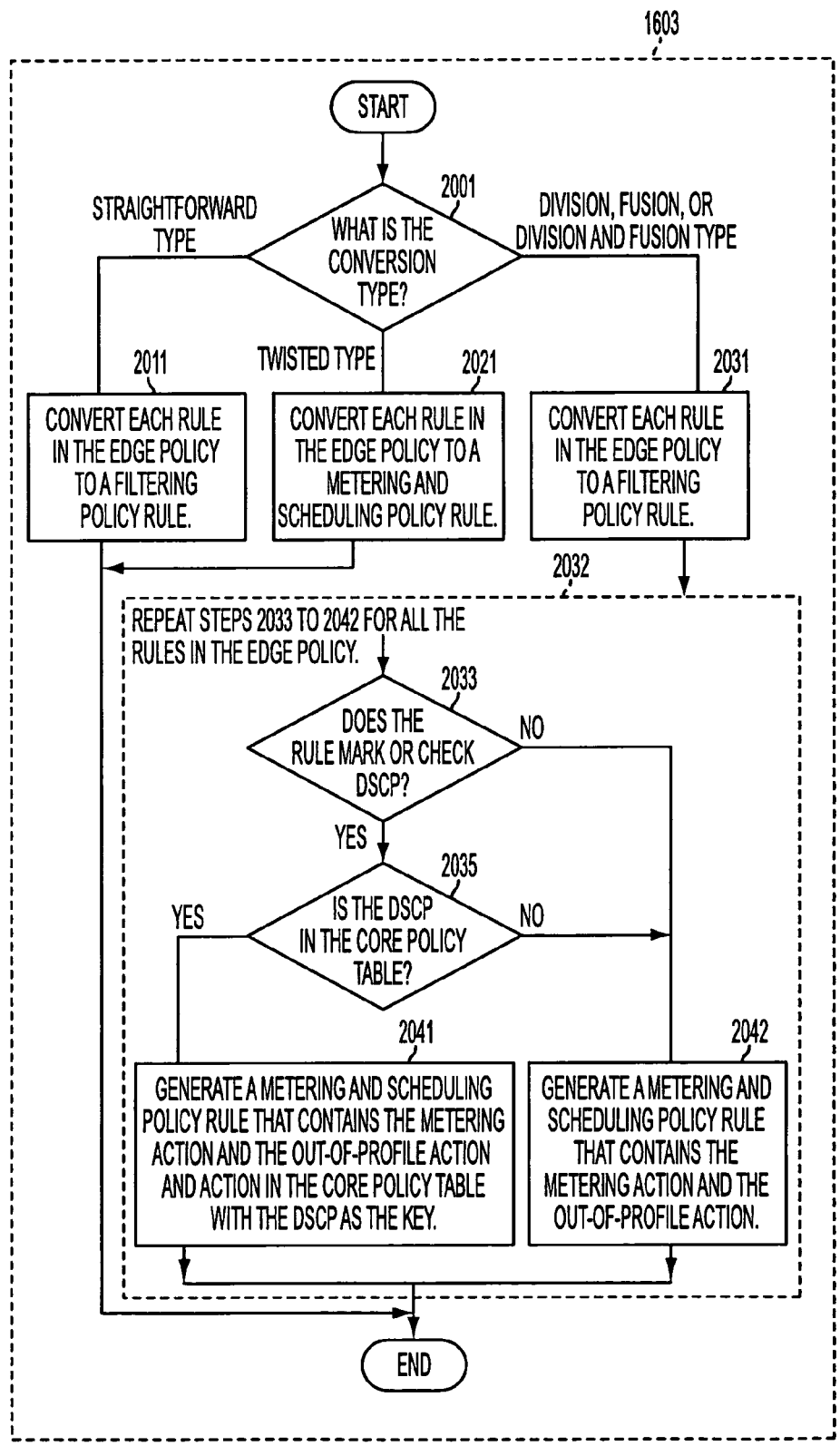

FIG. 20 is a flow diagram showing steps of an exemplary embodiment of the policy conversion procedure of the policy compiler shown in FIG. 16.

Figure 21A:
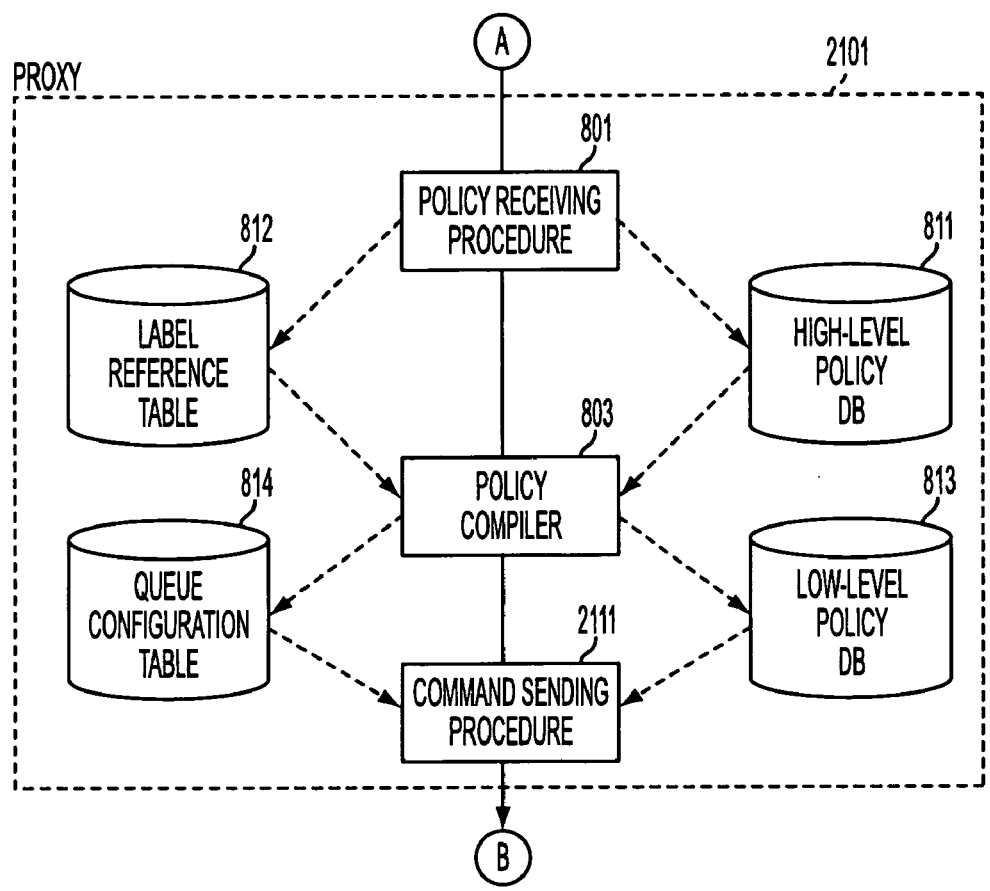
Figure 21B:
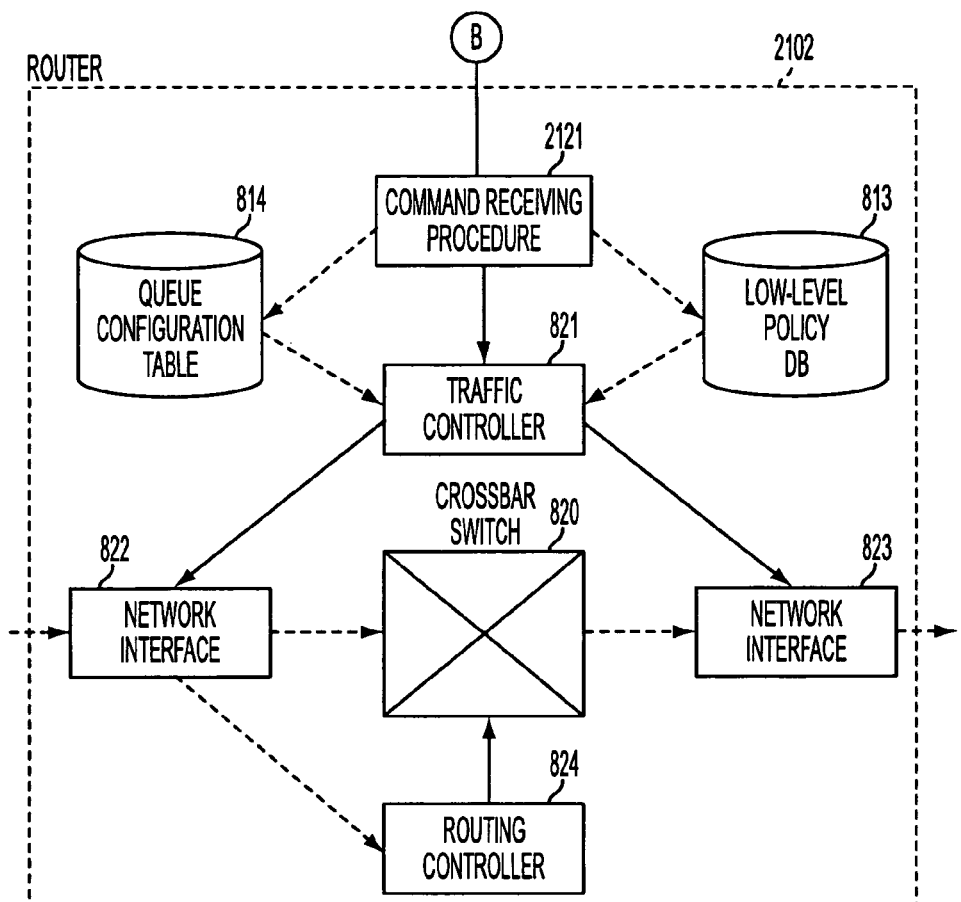

FIGS. 21(a) and 21(b) are schematic diagrams of an exemplary embodiment of a router.

Figure 22:
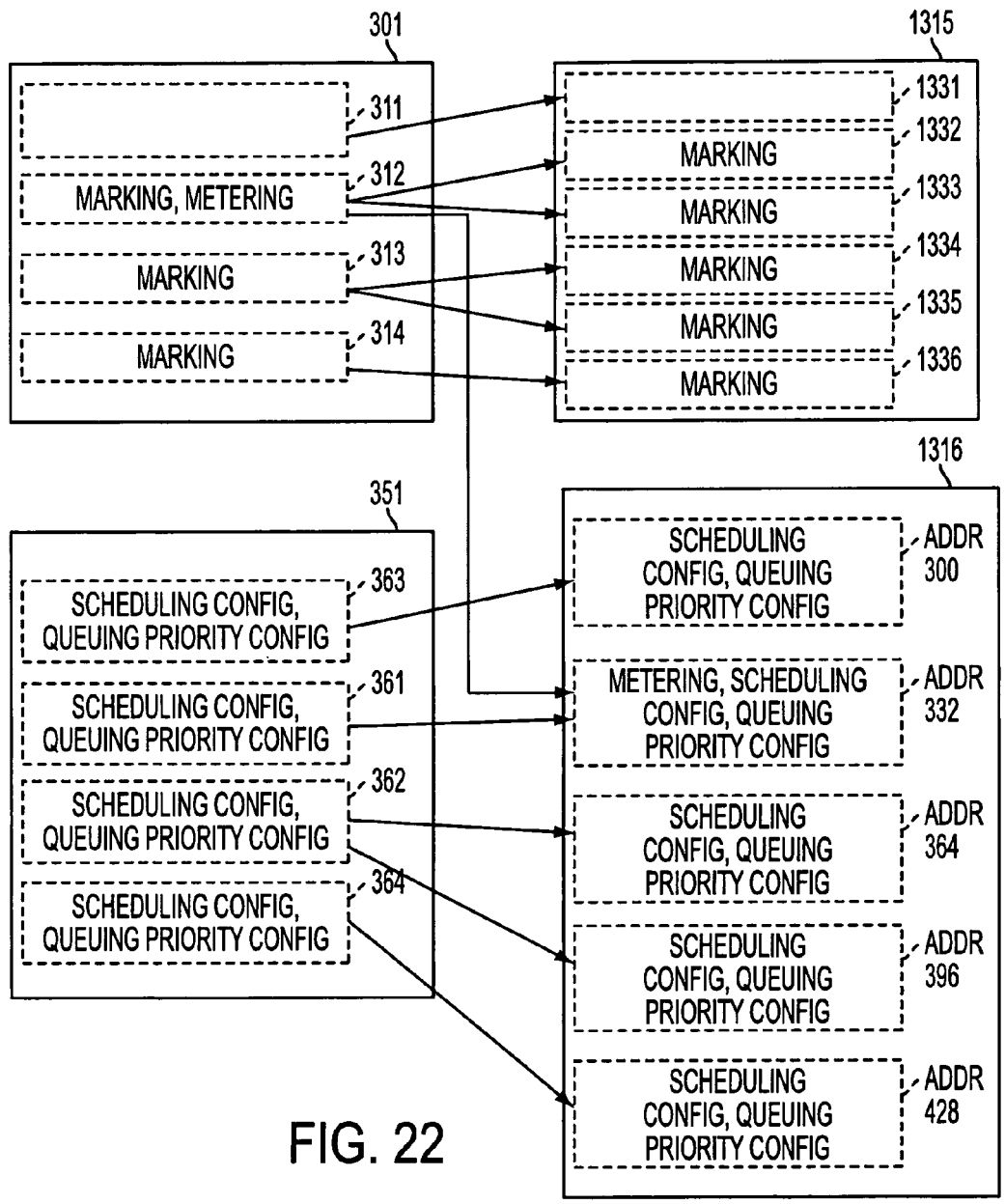

FIG. 22 is a diagram illustrating the relationship among policies in an exemplary embodiment of the present invention.

Figure 23A:
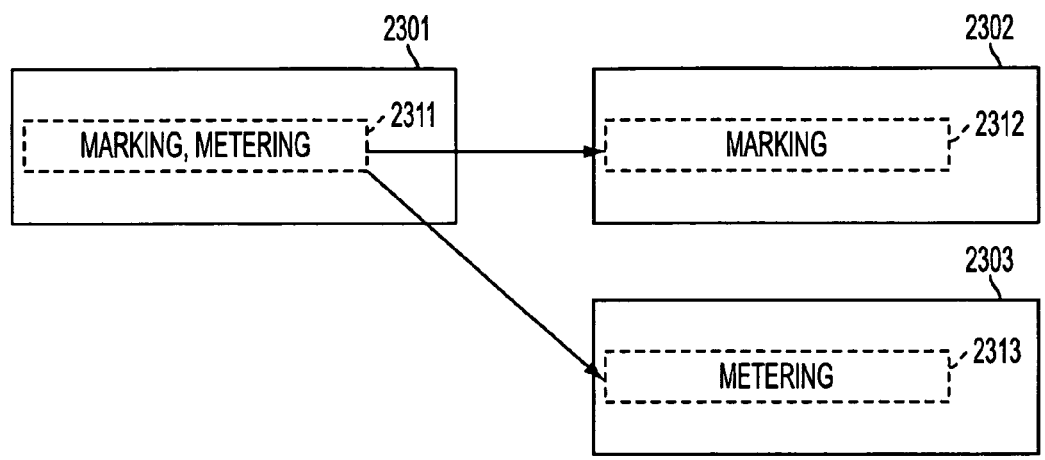
Figure 23B:
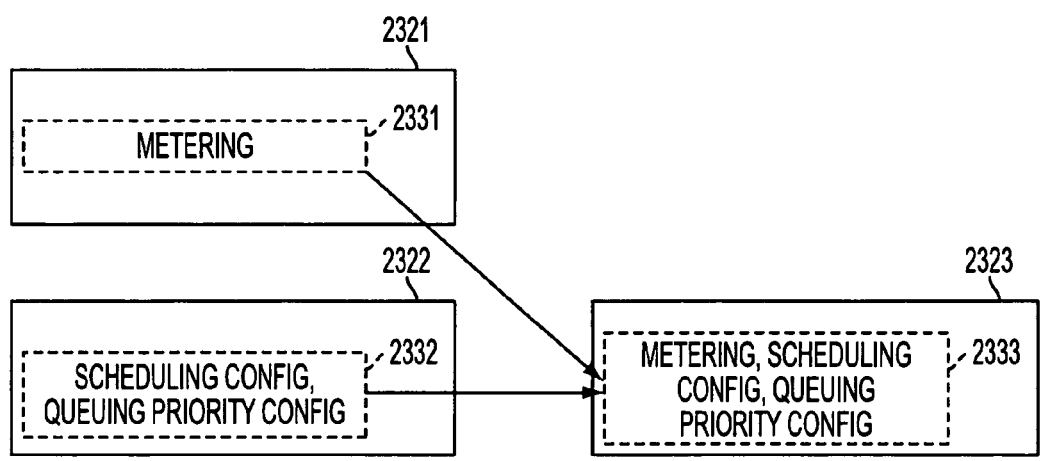

FIGS. 23(a) and 23(b) are diagrams illustrating the relationship among policies at the time of policy division and policy fusion according to an exemplary embodiment of the present invention.

DETAILED DESCRIPTION OF THE PREFERRED EMBODIMENTS

FIG. 1 is a network configuration diagram of an exemplary embodiment of the present invention for controlling a policy-based network 100. In an exemplary embodiment of the present invention, network 100 can perform policy division, policy fusion, or a combination of both. Network 100 can comprise a policy server, such as, for example, a policy server 103, for establishing policies. In accordance with an exemplary embodiment, conversion means convert at least one of a high-level policy into a plurality of low-level policies and a plurality of high-level policies into a low-level policy. In accordance with an exemplary embodiment, distributing means distribute within the network at least one of the low-level policy and the plurality of low-level-policies. A network node, such as, for example, routers 101, 111, or 121, receives at least one of the low-level policy and the plurality of low-level-policies.

In network 100, any network protocol, such as, for example, the Internet Protocol (IP), can be used to communicate among network devices. Network 100 can be comprised of any collection of network devices. In an exemplary embodiment, application servers 131 and 132, and clients 141, 142, 143 and 144 that use application servers 131 and 132, are connected in network 100. For example, through network 100 reproduction of MPEG images or audio data, or the use of the World Wide Web, including multimedia data, can be initiated.

According to an exemplary embodiment of the present invention for performing policy division, a first policy can be established within a policy server, such as, for example, policy server 103 of network 100. The first policy can include at least a first function and a second function. The first policy can be converted into at least a second policy and a third policy. The second policy can be associated with the first function and the third policy can be associated with the second function. The second policy and the third policy can be distributed within network 100 to at least one network node. In an exemplary embodiment of the present invention, a network node can be, for example, a router, such as routers 101, 111, or 121. The at least one network node can be controlled using the second policy and the third policy. In exemplary embodiments, if the first policy acts upon packets generated in clients 141, 142, 143, or 144, or upon packets that come through, for example, router 106 in FIG. 1, the second policy can be distributed to, for example, interface 125 of router 121, and the third policy can be distributed to, for example, interface 123 or 125 of router 121. If the first policy works on packets generated in client 145, the second policy can be distributed to, for example, interface 124 of router 121, and the third policy can be distributed to, for example, interfaces 124 or 123 of router 121.

In an exemplary embodiment of the present invention for performing policy fusion, at least a first policy and a second policy can be established within a policy server, such as, for example, policy server 103 of network 100, in which the first policy can include at least a first function and the second policy can include at least a second function. The first policy and the second policy can be converted into a third policy, in which the third policy can be associated with the first function and the second function. The third policy can be distributed within the network to at least one network node, such as, for example, routers 101, 111, or 121. The at least one node can be controlled using the third policy.

A policy is a sequence or a collection of rules called "policy rules". Policy rules are condition-action type (e.g., if-then) rules. That is, a policy rule describes an action to occur when a given condition holds. When a sequence is specified for policy rules within a policy, these policy rules are searched through in the sequence until a rule with an existing condition is found.

While a policy server (e.g., policy server 103) typically handles high-level policy rules, in the configuration of a network device, such as, for example, a router, low-level policy rules are also frequently used. For instance, a router uses policy rules in QoS control, access control, and so forth. Accordingly, such a network device may be viewed as being controlled through low-level policy rules. In this case, a policy server, or a proxy server that mediates a policy server and a network device, provides conversion from high-level policies to low-level policies.

In a policy-controlled network system in which policies are input to a policy server (e.g., policy server 103), the configuration across the whole network may be done through the input of a small amount of information. Furthermore, a policy-controlled network system can provide network control functions that would be difficult to implement by human operators, such as changing a policy by a time of day or dynamically in response to a request from an application program.

In converting a high-level policy of a policy server into a low-level policy for a network device, if those policies can correspond in a one-to-one relationship, then the conversion is straightforward. In other words, if a single low-level policy which is capable of implementing the same function exists for each high-level policy, the only processing required would be a level conversion. However, since such low-level policies are subject to the constraints of the hardware or software functions of the network device, the one-to-one conversion may not always be achieved. Consequently, a high-level policy may have to be translated into two or more lower-level policies, and two or more cooperating higher-level policies may have to be translated into one lower-level policy.

There are two types of transformation in the higher-level-to-lower-level policy translation: policy division and policy fusion. If a higher-level policy is transformed into two or more lower-level policies, this transformation is called a policy division. If two or more higher-level policies are transformed into a lower-level policy, this transformation is called a policy fusion. A transformation may be a combination of policy division and policy fusion. For example, a set of higher-level policies may be transformed into a set of lower-level policies, where functions of a higher-level policy are separated into two or more lower-level policies and functions of two ore more higher-level policies are merged into a lower-level policy.

In an exemplary embodiment of the present invention for performing policy division, the first policy can include at least a first policy rule having the first function in the first policy rule and a second policy rule having the second function in the second policy rule. The second policy can include at least a third policy rule having the first function in the third policy rule. The third policy can include at least a fourth policy rule having the second function in the fourth policy rule.

In an exemplary embodiment of the present invention for performing policy fusion, the first policy can include at least a first policy rule having the first function in an action part of the first policy rule. The second policy can include at least a second policy rule having the second function in an action part of the second policy rule. The third policy can include at least a third policy rule having the first function in an action part of the third policy rule and a fourth policy rule having the second function in an action part of the fourth policy rule.

In policy fusion, flows to which no rule in a policy is applied can be called default flows. In an exemplary embodiment of the present invention, to handle default flows, the first policy can include at least a first policy rule having a first condition in a condition part of the first policy rule and having in an action part of the first policy rule a marking action of a first value of a field in each of a plurality of data packets. The second policy can include at least a second policy rule, a condition part of the second policy rule determining whether the field in each of the plurality of data packets contains the first value, and having the first function in an action part of the second policy rule. The third policy can include at least a third policy rule and a fourth policy rule, in which the third policy rule can include the first condition in a condition part of the third policy rule and the first function in an action part of the third policy rule. The fourth policy rule can include a condition part for determining whether the field in each of the plurality of data packets contains the first value, and can include the first function in an action part of the fourth policy rule.

In the following discussion, although each of the network devices which can comprise an exemplary embodiment of network 100 can be assigned any IP address and allocated any subnet address, for illustrative purposes only and to facilitate a discussion of exemplary embodiments of the present invention, each of the network devices can be assigned a specific IP address and allocated a specific subnet address.

For illustrative purposes, an IP address of, for example, "192.168.1.2" can be given to router 101. Router 101 can have, for example, network interfaces 102, 104 and 105. Network interfaces 102, 104 and 105 can be allocated with interface numbers, such as, for example, 1, 2 and 3, respectively. In addition, an IP address of, for example, "192.168.2.2" can be given to router 111. Router 111 can have, for example, network interfaces 112, 113 and 114. Network interfaces 112, 113 and 114 can be allocated with interface numbers, such as, for example, 1, 2 and 3, respectively. Furthermore, an IP address of, for example, "192.168.3.2" can be given to router 121. Router 121 can have, for example, network interfaces 122, 123, 124 and 125. Network interfaces 122, 123, 124 and 125 can be allocated with interface numbers, such as, for example, 1, 2, 3 and 4, respectively.

Routers 101 and 111 can be connected at their network interfaces 102 and 112, respectively, and to this line a subnet address of, for example, "192.168.1.*" can be allocated. Routers 111 and 121 can be connected at their network interfaces 113 and 123, respectively, and to this line a subnet address of, for example, "192.168.2.*" can be allocated. Routers 121 and 101 can be connected at their network interfaces 123 and 105, respectively, and to this line a subnet address of, for example, "192.168.2.*" can be allocated.

Application server 131 can be connected to the network interface 104 of the router 101, and to this subnet an address of, for example, "192.168.4.*" can be allocated. Application server 132 can be connected to network interface 114 of router 111, and to this subnet an address of, for example, "192.168.5.*" can be allocated. Clients 141, 142, 143 and 144 can be connected to network interface 125 of router 121, and to these subnets addresses of, for example, "192.168.6.*" and "192.168.7.*" can be allocated, respectively. Router 106 can also be connected to network interface 125 of router 121. Addresses allocated to clients 141, 142, 143 and 144 can be, for example, "192.168.7.1", "192.168.7.2", "192.168.7.3" and "192.168.7.4", respectively. Client 145 can be connected to network interface 124 of router 121, and to this subnet an address of, for example, "192.168.8.*" can be allocated. The address allocated to client 145 can be, for example, "192.168.8.1". Although, in the above description, router 121 has been explained as being a router, the present invention may be implemented in a similar manner as described herein using, for example, an access node instead of router 121.

The configuration of policy server 103 will now be described with reference to FIG. 2. Policy server 103 can be implemented on a general-purpose computer, such as, for example, a personal computer (PC) or a computer workstation. A policy input section, implemented as policy input procedure 202, and a policy sending section, implemented as policy sending procedure 206, that can constitute policy server 103 can be both implemented by means of, for example, software. A policy repository 211 and a network configuration management table 213 can be stored on a hard disk, in a main memory, or on any electronic storage media. Policy server 103 can be connected to an operator console 201 to, for example, receive inputs from, and provide outputs to, an operator. Policy rules can be added, deleted or updated using operator console 201. Input/output (I/O) to and from operator console 201 can be controlled by policy input procedure 202. Any policy rules entered can be stored in policy repository 211. Policy sending section 206 can add or delete any policy rule retrieved from policy repository 211 to or from a network device, such as, for example, a router. The network configuration management table 212 can be used to identify, for example, a subject router.

Input items that policy input procedure 202 can receive from operator console 201 will be explained with reference to FIGS. 3(*a*) and 3(*b*). The operator can first select a type of policy rule to be entered. In accordance with exemplary embodiments of the present invention, policy types available can be, for example, "Edge" and "Core". However, any policy type can be used with exemplary embodiments of the present invention. An edge policy is a policy to specify, at an edge router, a method for classifying a packet flow (Multi-Field (MF) Classification) from a particular IP address or application and whether or not to discard the packets when the amount of the flow exceeds a given value (Policing). An edge policy can also be used to specify the DSCP to be marked in the DS field of the packets. A core policy is a policy to specify a method for classifying the flow based on the DSCP (Basic Aggregate (BA) Classification), to specify a packet scheduling algorithm to be used when outputting a packet from a router to a line, and to specify a priority of an output queue and bandwidth for each queue. The operator may enter the policy rules shown in FIGS. 3(*a*) and 3(*b*) using, for example, a graphical user interface (GUI) running on operator console 201, or any software program that allows an operator to enter policy rules.

In FIG. 3(*a*), an edge policy 301 can comprise edge policy rules 311, 312, 313 and 314. Edge policy rule 311 can be applied to those packets originating from the IP addresses of, for example, "192.168.6.*" or "192.168.6.1" through "192.168.6.255". Edge policy rule 311 allows those packets having a DSCP of, for example, "18" to pass through without processing. Edge policy rule 312 can be applied to those packets originating from the IP address of, for example, "192.168.7.1" or "192.168.7.3". If the transmission rate is found to be, for example, equal to or less than 1 Mbps as found by metering the packet flow, edge policy rule 312 sets, for example, "46" to the DS field, and if the rate, for example, exceeds 1 Mbps edge policy rule 312 discards the exceeding number of packets. Edge policy rule 313 can be applied to those packets originating from an IP address of, for example, "192.168.7.2" or "192.168.7.4", and sets, for example, "10" to the DS field of those packets. Edge policy rule 314 can mark, for example, zero on the DS field of the packets to which any of the above edge policy rules have not been applied.

In FIG. 3(*b*), core policy 351 can comprise core policy rules 361, 362, 363 and 364. Core policy rule 361 can be applied to those packets having a DSCP of, for example, "46", and can set the scheduling algorithm ("Scheduling_algorithm") associated to those packets to, for example, "Priority". In other words, core policy rule 361 specifies the packets scheduling based on, for example, priority. Core policy rule 361 can also set the packets queue priority ("Queue_priority") to, for example, "6". Core policy rule 362 can be applied to those packets having DSCP of, for example, "10", and core policy rule 362 can set Scheduling_algorithm associated to those packets to, for example, "Priority", and can also set their Queue_priority to, for example, "5". Core policy rule 363 can be applied to those packets having DSCP of, for example, "18", and core policy rule 363 sets Scheduling algorithm associated to those packets to, for example, "Priority", and their Queue_priority to, for example, "5". Core policy rule 364 can be applied to those packets which have not been applied with any of the above core policy rules, and core policy rule 364 can set Scheduling_algorithm associated to those packets to, for example, "Priority", and their Queue_priority to, for example, "2".

The content of policy repository 211 will be explained with reference to FIG. 4. FIG. 4 represents the content of the policy repository 211 when all the policy rules illustrated in FIG. 3 are newly fed into policy input procedure 202. The policy repository 211 can comprise an edge policy repository 401 and a core policy repository 402. The edge policy repository 401 can include the edge policy rules 311, 312, 313 and 314 that have been entered. Rule identifier fields 411, 412, 413 and 414 and event fields 421, 422, 423 and 424 can correspond to each respective edge policy rule. The event field specifies an action that the policy server 103 should carry out for the corresponding policy rule. According to an exemplary embodiment, the types of policy operations can include, for example, "Deploy", "Undeploy" and "Redeploy", although any type specifier can be used. However, in this case, since it is assumed that all the policy rules have been newly entered, "deploy" can be specified for all the edge policy rules.

As shown in FIG. 4, core policy repository 412 can include the entered core policy rules 361, 362, 363 and 364, with rule identifier fields 431, 432, 433 and 434 and event fields 451, 452, 453 and 454 being attached to each respective core policy rule. In event fields 451, 452, 453 and 454, "deploy" is specified for all the core policy rules in a similar manner as event fields 421, 422, 423 and 424.

The operation of policy input procedure 202 will be explained with reference to FIG. 5. In FIG. 5, when policy input procedure 202 begins to operate, the processes from steps 501 through 532 can be repeated indefinitely. In step 501, an editing menu for the rules, or a menu to select either from, for example, "Define New Rule", "Edit Existing Rule", or "Send Policy" (Deploy), can be displayed on operator console 201 to prompt an operator to provide an input. In step 502, the operator's input is determined whether it has been "Define New Rule", "Edit Existing Rule" or "Send Policy". The process proceeds to step 511 when it is determined to be "Define New Rule", to step 521 when it is determined to be "Edit Existing Policy", or to step 532 when it is determined to be "Send Policy".

In step 511, one new rule identifier currently not used can be generated. Next in step 512, a rule type input menu can be displayed on operator console 201 to prompt the operator to provide an input. In step 514, using the above rule identifier as a key, the contents of the condition part and action part can be entered into, for example, edge policy repository 401 or core policy repository 402, depending on the rule type. When edge policy rule 311 is input, for example, "#1" can be generated as the rule identifier in step 511, and rule 311, with rule identifier "#1" 411 as the key, can be registered into edge policy repository 301. When core policy rule 361 is entered, for example, "#5" can be generated as the rule identifier in step 511, and the rule 361, with rule identifier "#5" 431 as the key, can be registered into the core policy repository 351. The process then proceeds to step 531.

In step 521, a rule selection menu can be displayed on operator console 202 to allow the selection of a rule to be edited among the rules that have already been input, and to wait for an operator input. Upon the reception of the operator input, in step 522, any one of the templates shown in FIG. 4 can be used. In addition, the content of the selected rule and, for example, "OK" and "Delete" buttons can be displayed to prompt the operator to click. At this point, the operator may freely overwrite the content of the rule on the template. When either of the buttons is clicked, for example, the process goes to step 524. In step 524, the determination can be made whether the clicked button was, for example, "OK" or "Delete". When it is detected to be the "OK" button, the process goes to step 525. When detected to be the "Delete" button, the process goes to step 527.

In step 525, the edited content of the rule can be registered to policy repository 211 with the rule identifier of the edited rule as a key. The process then proceeds to step 531. In step 527, the registered rule having the rule identifier as the key, which exists in policy repository 211, can be deleted. The process then proceeds to step 531. In step 531, for example, "Deploy" can be entered into the event field of the subject rule in the policy repository. The process then returns to step 501 and waits for a next operator input. In step 531, the policy sending procedure 206 can be designated.

The content of network configuration management table 212 will be explained with reference to FIG. 6. The network configuration management table 212 can comprise, for example, three fields consisting of, for example, an IP address field 611, a router IP field 612, and a router interface field 613. To this network configuration management table 212, four items have been registered. In first item 602, IP address field 611 holds, for example, "192.168.4.*", router IP field 612 holds, for example, "192.168.1.2", and router interface field 613 holds, for example, "3". First item 602 specifies that the interface connected to the subnet address of, for example, "192.168.4.*" is the interface No. 3 of the router at the IP address of, for example, "192.168.1.2". Second item 603 specifies that the interface No. 3 of the router at the IP address of, for example, "192.168.2.2" can be connected to the subnet address of, for example, "192.168.5.*". Third item 604 specifies that the interface No. 4 of the router at the IP address of, for example, "192.168.3.2" can be connected to the subnet address of, for example, "192.168.6.*". Fourth item 605 specifies that the interface No. 4 of the router at the IP address of, for example, "192.168.3.2" can be connected to the subnet address of, for example, "192.168.7.*". The subnet addresses of, for example, "192.168.6.*" and "192.168.7.*" can be connected to the same interface.

The operation of policy sending procedure 206 will be explained with reference to FIG. 7. When the policy sending procedure 206 is enabled, first, in step 701, the process of sub-step 702 is repeated for all the policy rules in a subject policy. In step 702, the processes of steps 703 through 721 are repeated for all the policies in policy repository 211.

More particularly, in step 703, a router and its interface number to which the subject policy is to be sent can be looked up in network configuration management table 212. If the condition part of the subject rule includes an IP address of the source point, such an IP address can be looked up in network configuration management table 212 to retrieve, for example, the router and interface number. If such an IP address is not included in the condition part of the subject rule, the subject rule is sent to all the routers governed by policy server 103. In the latter case, the processes of steps 704 through 721 can be repeated for all the interfaces of all the routers governed by policy server 103. When policy rule 311 is processed, since the source IP address is specified as, for example, "192.168.6.*", the lookup through network configuration management table 212 would give the router's IP address as, for example, "192.168.3.2" and the interface as, for example, No. 4. On the other hand, when policy rules 314 and 361 are processed, since the source IP addresses are not specified, the processes of steps 704 through 721 can be performed for all the interfaces of the routers 101, 111, and 121. Next in step 704, the event specified for that subject policy rule can be determined. If it is, for example, "Deploy" the process goes to step 711, and if it is, for example, "Undeploy", then the process goes to step 721.

Step 711 determines whether or not the subject policy rule has already been sent to, and stored in, for example, the router. In this step, the determination is made, not through a query to the router, but based on, for example, the information held by policy server 103. As explained in the description with reference to FIG. 16, if a flag is used to indicate whether or not a rule has been sent, then in step 711 this determination can be made only by referencing that flag. As a result of the determination, if the rule is still on the router, the process goes to step 712. If not, then the process goes to step 716.

In step 712, for example, a "Redeploy" command for the rule can be sent to the router. In this "Redeploy" command, the rule identifier and the interface number of that rule can be specified. Thereafter, the iteration of step 712 is terminated.

In step 716, for example, a "Deploy" command for the rule can be sent to the router. In this "Deploy" command, the rule identifier, the content of the rule, and the interface number can be specified, for example. When item 702 is being processed, since the rule identifier of the specified rule is, for example, "#1", item 402 and a table (A) indicated by items 402 are extracted from policy repository 211, and the content thereof is sent. The type of the command can be "Deploy", as it can be specified in event field 722 of the item 702. Then the iteration of step 712 is terminated. Step 716 can be executed both when a rule is added, and when a rule is updated. When a rule is added, this rule can be added to, for example, router 121. When a rule is updated, the rules that have previously been defined by the same rule identifier as the subject rule can be replaced by this updated rule.

In step 721, for example, an "Undeploy" command for the rule can be sent to the router. In this "Undeploy" command, the rule identifier of the rule and the interface number can be specified.

The configuration of a network device, such as, for example, router 121, will be explained with reference to FIG. 8. FIG. 8 is also applicable to routers 112 and 101. According to an exemplary embodiment of the present invention, policy receiving section 801 and policy compiler 803 can be implemented by means of, for example, software. In accordance with an exemplary embodiment, a crossbar switch 820 and network interfaces 822 and 823 can be implemented by means of, for example, hardware. In addition, a traffic controller 821 and a routing controller 824 can be implemented by means of software or hardware. A label reference table 812 and a high-level policy database (DB) 811 can be stored in a main memory or any other electronic storage media. A low-level policy DB 813 and a queue configuration table 814 can be stored in a register, the main memory, or any other electronic storage device.

Policy receiving section 801 can receive policy rules from policy server 103 and can store them into the high-level policy DB 811, and can generate the label reference table 812. The policy compiler 803 can convert the format of the policies contained in high-level policy DB 811 into an executable format, and can store the results into the low-level policy DB 813 and the queue configuration table 814.

Traffic controller 821, using low-level policy DB 813 and queue configuration table 814, can control the network traffic in network interfaces 822 and 823. Between these network interfaces, crossbar switch 820 can conduct the data transmission, which in turn can be controlled by the routing controller 824.

The configuration of network interface 822 will be explained with reference to FIG. 9. Network interface 823 can also be configured in the same manner as FIG. 9. Packets input to network interface 822 can be first classified at a flow classifier section 901 as to which of the flows they belong. A filtering policy rule can control the flow classifier section 901. A list of conditions in the policy rules forms a classifier. A classifier classifies flows that must be handled by the policy. A filtering policy can classify, filter, and/or mark a DSCP on packets. Consequently, a filtering policy can be used for access control and marking.

In an exemplary embodiment of the present invention for performing policy division, the first policy can include a list of condition parts of policy rules included in the first policy. The second policy can include a list of condition parts of policy rules included in the second policy. The third policy can include a list of condition parts of policy rules included in the third policy. The list of condition parts included in the first policy can be equal to the list of condition parts included in the second policy and the list of condition parts included in the third policy.

Next, at flow meter section 902, the flow can be determined as to whether or not it satisfies the specified traffic condition, and based on the result, at scheduler section 903, a queue for allocating the packets can be selected among output queues contained in scheduler section 903, and the flow can be shaped as necessary, and then an action, such as, for example, discarding the packets can be taken. A metering/scheduling policy rule can control flow meter section 902 and the scheduler section 903. The information rate and burst size of flows can be metered by using a metering/scheduling policy. Packets can also be queued, scheduled, and classified by using this type of policy. The output from the queue can be sent out to crossbar switch 820.

The content of high-level policy DB 811 will be explained with reference to FIG. 10. FIG. 10 represents the content of high-level policy DB 811 where all the inputs shown in FIG. 3 are fed into the policy receiving section in the specified sequence. The contents of the Rule ID field 1021 of the high-level policy DB 811 can be equal to those of the corresponding rule identifier fields 411, 412, 413, 414, 431, 432, 433 or 434 of policy repository 211. When a subject rule belongs to edge policy 301, value, for example, "Edge" can be entered into Policy type field 1022, and if belongs to the core policy 351, then value, for example, "Core", can be entered into Policy type field 1022. A Rule field 1023 can contain a pointer associated with a subject rule. An Interface field 1024 can indicate a network interface number that a subject rule shall act upon. A Codep field 1025 can indicate an address in policy rule table 813 at which a converted subject rule can be stored.

Row 1011 represents the information on rule 311. That is, its rule ID 1021 can be, for example, "#1", it can have the policy type of, for example, "Edge" (meaning it is an edge policy rule), the rule pointer can point to rule 311, the interface that this rule can act upon can be, for example, No. 4, and the starting address of the code generated from this rule can be, for example, 90. Row 1015 represents the information on rule 351. That is, its rule ID 1021 can be, for example, "#5", it can have the policy type of, for example, "Core" (meaning it is a core policy rule), the rule pointer can point to rule 351, the interfaces that this rule can act upon can be, for example, Nos. 1, 2, 3 and 4, and the starting address of the code generated from this rule can be, for example, 332.

The content of the label reference table 212 will be explained with reference to FIG. 11. Label reference table 1101 can contain four elements. First element 1111 can include, for example, "DSCP" as a label type and "18" as a label value. It can also include a value, for example, "#1" as a defining rule identifier, and a value, for example, "#7" as a referring rule identifier. This specifies, for example, that the DSCP having a value of "18" is defined under the defining rule "#1" and used under the referring rule "#7". Second element 1112 can include, for example, "DSCP" as a label type, "46" as a label value, "#2" as a defining rule identifier, and "#5" as a referring rule identifier. This specifies, for example, that the DSCP having a value of "46" is defined under the defining rule "#2" and used under the referring rule "#5". Third element 1113 can include, for example, "DSCP" as a label type, "10" as a label value, "#3" as a defining rule identifier, and "#6" as a referring rule identifier. This specifies, for example, that the DSCP having a value of "10" is defined under the defining rule "#3" and used under the referring rule "#6". Fourth element 1114 includes, for example, "DSCP" as a label type, "0" as a label value, "#3" as a defining rule identifier, and "#8" as a referring rule identifier. This specifies, for example, that the DSCP having a value of "0" is defined under the defining rule "#3" and used under the referring rule "#8". As described, these elements each can include one value for each of the defining rule and referring rule. However, these elements may have plural values.

The operation of policy receiving section 801 will be explained with reference to FIG. 12. When policy receiving section 801 is enabled, first in step 1201, it waits for data sent from policy server 103. When the data is received, the command contained in that received data is determined in step 1202. When it is, for example, a "Deploy" command, the process goes to step 1211, when it is, for example, an "Undeploy" command, the process goes to step 1221, and when it is, for example, a "Redeploy" command, then the process goes to step 1212.

In step 1211, the rule included in the "Deploy" command can be entered into a high-level policy DB 811 with the rule identifier as the key. The process then proceeds to step 1212. In step 1212, the rule identifier of the received rule can be entered into label reference table 812. The process then proceeds to step 1231.

In step 1221, any rule having the rule identifier specified in the "Undeploy" command can be deleted. Next in step 1222, the rule identifier of the received rule can be deleted from label reference table 812. The process then proceeds to step 1231.

In step 1231, a determination can be made as to whether there is any subsequent data to be received. When there is further data, then the process returns to step 1201 to process the subsequent data received. If there is no further data, the process goes to step 1232. That is, in step 1231, whether or not the next data is arriving within a given time period can be checked, and if such data arrives, it can be processed, and if not, the process goes to the next step. In step 1232, all the rule identifiers that have been continuously received can be specified and a policy rule dependence analyzer 802 can be invoked. The process then goes back to step 1201 to process the next received data.

In step 1231, one group of data can be identified based on whether or not the next data arrives within a given period of time, and in order to identify a group of data more precisely and quickly, delimiters can be inserted into the sending data from policy server 103. More particularly, for example, "Commit" commands can be newly created, and such a "Commit" command can be issued upon each end of one policy transmission at the policy sending procedure. In, for example, router 101, step 1232 can be executed whenever a "Commit" command is received.

The content of low-level policy DB 813 will be explained with reference to FIGS. 13 and 14. In the low-level policy DB 813, rules can be stored in groups for respective network interfaces. That is, first element 1311 of FIG. 13 of a command starting address table 1301 can indicate a list of rules associated with the network interface having the interface, for example, No. 1, and second element 1312 of the command starting address table 1301 can indicate a list of rules associated with the network interface having the interface, for example, No. 2, and third element 1313 of the command starting address table 1301 can indicate a list of rules associated with the network interface having the interface, for example, No. 3. However, in FIG. 13, these lists are empty. Fourth element 1314 of the command starting address table 1301 can indicate a list of rules associated with the network interface having the interface, for example, No. 4, and it shows, for example, "90" (1305) as the starting address of the filtering policy and, for example, "300" (1306) as the starting address of the metering and scheduling policy.

Filtering policy 1315 will be explained. At the address "90", a rule 1331 can be located. Rule 1331 can be a low-level policy rule corresponding to rule 311. At addresses 118 and 146, respectively, rules 1332 and 1333 can be located. Rules 1332 and 1333 can be low-level policy rules corresponding to rule 312. At addresses 174 and 202, rules 1334 and 1335 can be respectively located. Rules 1334 and 1335 can be low-level policy rules corresponding to rule 313. At address 230, a rule 1336 can be located. Rule 1336 can be a low-level policy rule corresponding to rule 314. However, a part of the information of the rules in FIG. 3 can be stored in queue configuration table 814, and does not exist in FIG. 3.

In rule 1332, for example, "192.168.7.1" can be specified for the minimum source IP address 1321 of the flow. Also, the same address of "192.168.7.1" can be specified for the maximum source IP address 1322. Accordingly, rule 1332 can work upon those packets originating from the source of, for example, "192.168.7.1". There is no value specified for the source port 1323. This can specify that this rule would be applied to those packets to which any arbitrary flow source port is specified. The minimum destination IP address 1324 of the flow can be specified as, for example, "0.0.0.0".

As for the maximum destination IP address 1325 of the flow, for example, "255.255.255.255" can be specified. This specifies that the rule would be applied to those packets with any arbitrary destination IP address. Zero (i.e., "0") can be specified for the destination port 1326, and this means that the rule would be applied to those packets with any arbitrary port number. DSCP 1327 is not specified with any value. This specifies that rule 1332 would be applied to those packets having any arbitrary DSCP. In rule 331, DSCP 1327 is specified with, for example, "18". This specifies that rule 1331 would be applied to only those packets with DSCP of "18".

In rule 1332, "46" can be specified as a new DSCP 1328. This specifies that rule 1332 would rewrite the DSCP to "46". Since no filter action 1330 is specified, a filter action would not take place.

In rule 1332, for example, "192.168.7.1" can be specified for the minimum source IP address. The same "192.168.7.1" can also be specified for the maximum source IP address. Accordingly, rule 1332 can work upon those packets originating from the source of, for example, "192.168.7.1". There is no value specified for the source port 1323. This specifies that this rule is applied to those packets specifying any arbitrary flow source port.

For the minimum destination IP address 1324 of the flow, for example, "0.0.0.0" can be specified. For the maximum destination IP address 1325 of the flow, for example, "255.255.255.255" can be specified. This specifies that the rule would be applied to those packets with any arbitrary destination IP address. For the destination port 1326, for example, "0" can be specified, and this specifies that the rule would be applied to those packets with any arbitrary port number.

There is no value specified for DSCP 1327. This specifies that rule 1332 would be applied to those packets with any arbitrary DSCP. In rule 1331, for example, "18" can be specified for DSCP 1327. This specifies that rule 1331 can be applied only to those packets with DSCP of "18".

To summarize, the semantics of filtering policy rule 1332 that works upon network interface 125 of the router would be as follows. The DSCP of, for example, "46" is marked for a flow with the source address, for example, "192.168.7.1". In a filtering policy rule, conditions may not be coupled by a logical "OR" operator. That is, due to the constraint of hardware, any high-level policy rule including a logical "OR" operator conjunction(s) should be divided into a plurality of filtering policy rules. This is also true for metering and scheduling policy rules that will be described below.

Metering and scheduling policy 1316 will be explained. The rule at address 300 corresponds to rules 311 and 363. The rule at address 322 corresponds to rules 312 and 362. The rules at addresses 364 and 396 correspond to rules 313 and 362. The rule at address 428 corresponds to rule 364.

In the rule at the address 300, for example, "192.168.6.0" can be specified for the minimum source IP address 1341 of the flow. For the maximum source IP address, for example, "192.168.6.255" can be specified. Therefore, the rule at address 300 works upon those packets having a source address of, for example, "192.168.6.*". There is no value specified for the source port 1343. This specifies that this rule is applied to those packets specifying any arbitrary flow source port.

For the minimum destination IP address 1344 of the flow, for example, "0.0.0.0" can be specified. For the maximum 1345, for example, "255.255.255.255" can be specified. This specifies that the rule would be applied to those packets with any arbitrary destination IP address. For the destination port 1346, for example, "0" can be specified, specifying that the rule would be applied to those packets specifying any arbitrary port number.

For the DSCP 1347, for example, "18" can be specified. This specifies that the rule at address 300 is applied only to those packets with the DSCP of, for example, "18". As for information rate 1348, a value greater than, for example, "0" can be specified when providing the upper limit of the bandwidth, but "0" would be specified otherwise. In the rule at address 300, there is no specification of the upper limit. In the rule at address 332, for example, 1000 kbps can be specified. The In-Queue (in-profile queue) field 1349 specifies a queue for packets that satisfy the bandwidth specification. The queue number should be, for example, "0" or greater, but smaller than the number of queues. In the rule at address 300, for example, "5" can be specified. In the Out-DSCP (out-of-profile DSCP) field 1350, a value between, for example, "0" and "63" can be specified for the DSCP of any excess packets to be remarked when the bandwidth specification is not meet. When the DSCP is not to be remarked, any other value (e.g., 255) should be specified. In the rule at address 300, no value is specified. The Out-Queue (out-of-profile queue) field 1351 specifies a queue for packets that does not satisfy the bandwidth specification. The specified queue number can be, for example, "0" or larger, but it should be smaller than the number of queues. In Out-Drop (out-of-profile discarding action) field 1352, "drop" is specified when packets are to be discarded, because the specified bandwidth is exceeded. If Info-Rate (information rate) field 1328 is not specified, the content of the Out-Drop filed 1352 would be invalid.

In summary, the semantics of the metering and scheduling rule at address 332, which works upon, for example, network interface 125 of the router 121 is as follows. The flow with DSCP of, for example, "46" would be entered into the queue number "6" as long as its average rate does not exceed, for example, 1000 kbps; and if the rate exceeds, for example, 1000 kbps, any exceeding number of packets will be discarded.

The content of the queue configuration table 814 will be explained with reference to FIG. 15. In queue configuration table 814, queue configurations can be stored in groups for the respective network interfaces. That is, first row 1511 of queue configuration table 814 indicates the queue configuration of interface No. 1, and second row 1512 of queue configuration table 814 indicates the queue configuration of interface No. 2, and third row 1513 of queue configuration table 814 indicates the queue configuration of interface No. 3. However, in FIG. 15, these rows are empty. Fourth row 1514 of queue configuration table 814 indicates the queue configuration of interface No. 4, but its starting address is unspecified, and as a scheduling algorithm, "Priority-Schedl", which means priority scheduling, can be specified (1514). When the detailed queue configuration for each queue is necessary, starting address 1501 can be specified and the configuration can be written thereto.

The operation of policy compiler 803 will be explained with reference to FIG. 16. When policy compiler 803 starts operating, first, in step 1601, a conversion type decision procedure can be executed. Next in step 1602, a core policy table generation procedure can be executed. In step 1603, a policy conversion procedure can be executed.

In an exemplary embodiment of the present invention, an edge policy and a core policy can be translated into a filtering policy and a metering and scheduling policy. In accordance with exemplary embodiments, several conditions can be assumed: a.) (condition (a)) an edge policy can be given, but a core policy can be absent; b.) (condition (b)) if a core policy exists, it can have a BA classifier, i.e., the conditions in the core policy only have DSCP conditions; c.) (condition (c)) if the edge policy contains both marking or filtering action and metering action (i.e., the transformation requires a policy division), any rule in the edge policy cannot test a DSCP that any rule in it marks; d.) (condition (d)) if the edge policy contains metering action and the core policy exists (i.e., the transformation requires a policy fusion), the edge policy cannot have a default flow nor a loophole; e.) (condition (e)) if the edge policy contains a rule with multiple sub-conditions and metering, the edge policy cannot have a default flow nor a loophole, and the DSCP that the rule marks cannot be marked by other rules in the edge policy.

In accordance with exemplary embodiments, in a first edge policy pass, the edge policy can be scanned and the transformation type (i.e., division, fusion, division-and-fusion, or straightforward) can be determined. In a core policy pass, the core policy can be scanned and analyzed if it exists. If the transformation type is the straightforward type, a metering and scheduling policy can be generated from the core policy. Otherwise, the result of the analysis can be written into the core policy table. In a second edge policy pass, the edge policy can be scanned again, and the core policy table can be referred to when necessary. The policies can be transformed into a filtering and a marking and scheduling policies according to the transformation type. However, only a filtering policy is generated when the transformation type is the straightforward type.

In the first edge policy pass, the transformation type is determined. To determine the transformation type, two conditions can be tested: i.) (condition (i)) whether there is a rule with metering; and ii.) (condition (ii)) whether there is a rule with marking or filtering action in the edge policy. If condition (i) does not hold, no policy division nor fusion is required and the translation is straightforward; the filtering policy can be derived from the edge policy and the metering and scheduling policy can be derived from the core policy. However, the core policy may be absent. This transformation type can be referred to as the straightforward type.

If condition (i) holds and there is a core policy, a policy fusion is required. In this case, if the condition (ii) holds, a policy division is also required. In other words, the edge policy can be split and put into the filtering and the metering and scheduling policies. This transformation type can be referred to as the division-and-fusion type. If condition (i) holds, but condition (ii) does not hold, only the scheduling policy is generated. If there is a core policy, a policy fusion is required. This transformation type can be referred to as the fusion type. If there is no core policy, the metering and scheduling policy can be derived from the edge policy. This transformation type can be referred to as the twisted type. If conditions (i) and (ii) hold, but there is no core policy, i.e., only the edge policy is given, a policy division is necessary, but a policy fusion is not necessary. This transformation type can be referred to as the division type.

In the first edge policy pass, condition (b) should be satisfied. If there is a MF classifier in the core policy, the translation process can report an error and terminate.

In the core policy pass, if the transformation type is the straightforward type, a metering and scheduling policy can be generated from the core policy. If the transformation type is other than the straightforward type, then for each rule in the core policy, the list of actions can be entered into the core policy table with the DSCP in the condition as the key. However, if two or more rules have conditions that test the same DSCP, only the first rule is entered into the table, because a policy rule to be applied can be chosen by first match.

In the second edge policy pass, the filtering policy and the metering and scheduling polices can be generated. If the transformation type is the twisted type, the edge policy is copied to the metering and scheduling policy. If the transformation type is the division or division-and-fusion type, from each rule in the edge policy, a rule can be generated for the filtering policy and another rule for the metering and scheduling policy, even when there is no action for one of the policies. If the original rule marks or test a DSCP, the core policy table can be looked up with this DSCP, and the actions found can be fused into the rule for the metering and scheduling policy. If the transformation type is the fusion type, no rules for the filtering policy are generated. If the transformation type is the straightforward type, only rules for the filtering policy are generated.

If a rule in the edge policy has multiple sub-conditions, a rule can be generated from each sub-condition. This can be done even when the transformation type is the straightforward type. All the rules can mark the same DSCP. If the original rule has metering, a rule that tests the DSCP and meters can be generated for the metering and scheduling policy. To guarantee this specific type of policy division is correct, condition (e) should be satisfied. Condition (e) should be satisfied, because if there is a default flow or a flow through a rule with a loophole or there is an action that marks the same DSCP, the flow can be wrongly aggregated to the expected flow. Condition (e) can be removed if a virtual flow label is introduced into the transformation. If a separate rule that corresponds to each sub-condition can be generated for the metering and scheduling policy, condition (e) can also be removed. In the second edge policy pass, condition (c) should be tested if the transformation type is the division or division-and-fusion type. Condition (d) should be tested if the transformation type is the fusion or division-and-fusion type. If a violation is discovered, the translation process can report and error and terminate.

The operation of the conversion type decision procedure 1601 will be explained with reference to FIG. 17. First in step 1701, two variables, for example, "Meter" and "MarkOrFilter" can be initialized to, for example, "false". In step 1702, step 1703 can be repeated for all the rules that belong to an edge policy. In step 1703, when a subject rule is a rule for metering, in other words, when it has a function to be classified into a filtering policy, for example, "true" can be assigned to the variable "Meter". If the rule is a rule for marking or packet drop, in other words, when it has a function to be classified into a metering and scheduling policy, for example, "true" can be assigned to the variable "MarkOrFilter".

In step 1711, if the value of the variable "Meter" is false, then the conversion type (a variable) can be set to be, for example, a "straightforward type" (i.e., no division or fusion is required). In step 1712, when the value of the variable "Meter" is true and when the value of the variable "MarkOrFilter" is also true, then the conversion type can be set to be, for example, a "division and fusion type" if a core policy exists, and, for example, a "division type" if a core policy does not exist. In step 1713, when the value of the variable "Meter" is true, and the value of the variable "MarkOrFilter" is false, then the conversion type can be set to be, for example, a "fusion type" if a core policy exists, and to, for example, a "twisted type" if a core policy does not exist. When the policy in FIG. 3 is to be converted, its conversion type can be determined to be, for example, the "division and fusion type" in step 1712. Assuming that rule 312 of the policy in FIG. 3 does not include metering of the information rate, then the conversion type of the rule as a result of the procedure would be, for example, "straightforward type".

In order for the policy fusion in an exemplary embodiment of the present invention to be applicable, the condition of each rule in the core policy should be one associated with the DSCP, so that it can be checked for in conversion type decision procedure 1601. In order to include this checking procedure within the flow chart of FIG. 17, a process can be provided within the loop of step 1702 to determine whether or not a subject rule has only a DSCP condition, and to assign this result to a variable, and by using that variable, a checking process can be conducted immediately before exiting from the loop. The initialization of this variable should be performed in step 1701.

The content of the core policy rule table 1611 will be explained with reference to FIG. 18. Element 1801 specifies that when the DSCP is, for example "10", the scheduling algorithm can be set to priority scheduling, and the queue priority can be set to, for example, "5". Element 1802 specifies that when the DSCP is, for example, "18", the scheduling algorithm can be set to priority scheduling, and the queue priority can be set to, for example, "5". Element 1803 specifies that when the DSCP is, for example, "46", the scheduling algorithm can be set to priority scheduling, and the queue priority can be set to, for example, "6". The element 1804 specifies that when the DSCP is a value other than the above, the scheduling algorithm can be set to priority scheduling, and the queue priority can be set to, for example, "2".

The operation of the core policy table generation procedure 1602 will be explained with reference to FIG. 19. In step 1901, the conversion type can be determined whether it is, for example, the "straightforward type". If it is found to be the "straightforward type", the process goes to step 1912, and if it is not found to be the "straightforward type", then the process goes to step 1921. In step 1912, each of the rules in the core policy can be converted into a metering and scheduling policy rule, thereby terminating the core policy table generation procedure 1602.

In step 1921, the processes of steps 1922 through 1923 can be repeated for all the rules of the core policy. In step 1922, a determination can be made on whether or not the DSCP being referenced in the condition part of a subject rule has already been registered to the core policy table 1611. If it has not yet been registered, the process goes to step 1923, and if it has already been registered, the process goes to the next iteration of step 1921. In processing the policy of FIG. 3, the determination result would be "unregistered", therefore step 1923 would be executed. In step 1923, the action of the subject rule can be registered to core policy table 1611 using, as the key, the DSCP that is being referenced in the condition part of the subject rule. In the process for core policy rule 361, element 1803 can be generated; in the process for core policy rule 362, element 1801 can be generated; in the process for core policy rule 363, element 1802 can be generated; and in the process for core policy rule 364, element 1804 can be generated. When step 1921 completes, core policy table generation procedure 1602 can be terminated.

The operation of the policy conversion procedure 1603 will be explained with reference to FIG. 20. When policy conversion procedure 1603 is executed, first in step 2001, the conversion type can be determined. If the conversion type is, for example, the "straightforward type", the process proceeds to step 2011. If it is, for example, the "twisted type", the process proceeds to step 2021. If it is, for example, the "division type", "fusion type", or "division and fusion type", then the process proceeds to step 2031.

In an exemplary embodiment of the present invention, the first policy can include at least a first policy rule having at least a first condition and a second condition in a condition part of the first policy rule, in which the first condition and the second condition can be coupled with a logical "OR" operator. The second policy can include at least a second policy rule having the first condition in a condition part of the second policy rule and a third policy rule having the second condition in a condition part of the third policy rule. The third policy can include at least a fourth policy rule having the first condition in a condition part of the fourth policy rule and a fifth policy rule having the second condition in a condition part of the fifth policy rule.

In an exemplary embodiment of the present invention, the first policy can include at least a first policy rule having at least a first condition and a second condition in a condition part of the first policy rule, in which the first condition and the second condition are coupled with a logical "OR" operator. The second policy can include at least a second policy rule having the first condition in a condition part of the second policy rule and a third policy rule having the second condition in a condition part of the third policy rule. The second policy rule can include, in an action part of the second policy rule, a marking action of a first value in a field in each of a plurality of data packets. The third policy rule can include, in an action part of the third policy rule, a marking action of the first value in the field in each of the plurality of data packets. The third policy can include at least a fourth policy rule, and a condition part of the fourth policy rule can determine whether the field in each of the plurality of data packets includes the first value.

In an exemplary embodiment of the present invention, the first policy can include at least a first policy rule having at least a first condition and a second condition in a condition part of the first policy rule, in which the first condition and the second condition are coupled with a logical "OR" operator. The second policy can include at least a second policy rule having the first condition in a condition part of the second policy rule and a third policy rule having the second condition in a condition part of the third policy rule. The second policy rule and the third policy rule can each define a first virtual flow label value. The third policy can include at least a fourth policy rule, and a condition part of the fourth policy rule can determine the first virtual flow label value.

In step 2011, each of the rules in an edge policy rule can be converted into a filtering policy rule. In this conversion, any rule that has a plurality of conditions coupled by a logical "OR" operator can be divided into a plurality of rules of different conditions. At this point, the action part can be copied. In the process for the policy of FIG. 3, if rule 312 does not include metering of the information rate, steps 1912 and later can be executed, and filtering policy rules can be generated; e.g., one rule from each of rules 311 and 314, and two rules from each of rules 312 and 313 for each source IP address.

In step 2021, each of the rules in an edge policy can be converted into a metering and scheduling policy rule. Again in this conversion, any rule having a plurality of conditions that are coupled by a logical "OR" operator can be divided into a plurality of rules with different conditions.

In step 2031, each of the rules in an edge policy can be converted into a filtering policy rule. However, if a subject rule includes metering and out-of-profile actions, those are ignored. In the process for edge policy rule 312, the step would be executed as follows. Since edge policy rule 312 has two conditions that are coupled by a logical "OR" operator, separate rules are generated for the two different conditions. For the first condition, rule 1332 can be generated, and for the second condition, rule 1333 can be generated. Although edge policy rule 312 has a metering condition of, for example, "Information_rate<=1 Mbps" and an out-of-profile action of, for example, "drop", these are ignored, and based on the in-profile action of, for example, "DSCP=46", "46" can be written as the new DSCP 1328 of rules 1332 and 1333.

In step 2032, steps 2033 through 2042 are repeated for all the rules of the edge policy. In step 2033, a determination can be made on whether or not the action part of a subject rule demands marking of the DSCP, or whether or not its condition part checks for the DSCP, and if the determination result is true, the process goes on to step 2035, and if false, the process goes to step 2042. In the process for edge policy rule 311, since its condition part serves to determine whether the DSCP value is "18", this condition would be found true. In the process for edge policy rule 312, since its action part serves to assign a value of, for example, "46" to the DSCP, this condition would be found true. In all the rules shown in FIG. 3(a), this condition would be found true.

In step 2035, a determination can be made on whether a subject DSCP has already been registered in core policy table 1611. When it has already been registered, the process goes on to step 2041, and if not, the process goes to step 2042. In the process for the policy shown in FIG. 3, the process would proceed to step 2041, however, if a core policy does not exist in the policy of FIG. 3, the core policy table would also be empty so that the process goes to step 2042.

In step 2041, a metering and scheduling policy rule can be generated by combining the metering and out-of-profile actions of the subject rule with an action obtained from the core policy table using the subject DSCP as the key. At this point, if the subject rule does not have a plurality of conditions that are coupled by a logical "OR" operator, or if it does not perform a metering action, as many rules are generated as the number of the conditions in the subject rule, and for the condition part of the each generated rule, one of the conditions in the subject rule is used. When the subject rule provides the metering action, a single rule is generated, and for the condition part of the generated rule, the condition for checking the DSCP is used.

In the process for edge policy rule 311, since the DSCP is, for example, "18", core policy table 1611 is looked up using "18" as the key. Since the action part of edge policy rule 311 is empty, the action contained in table element 1802 obtained from core policy table 1611 is written into the rule at address 300 of metering and scheduling policy 1316. That is, for example, "5" can be written as the in-profile queue number. Furthermore, if there is no value yet in element 1514 corresponding to interface No. 4 in queue configuration table 814, "PrioritySchedl" is written thereto. If a value has already been written in element 1514, then that value and "PrioritySchedl" are compared, and an error message is generated if there is a discrepancy. As for DSCP condition 1347 of the rule at address 300, the subject DSCP, or, for example, "18", is written. No further conditions are added besides the DSCP. In other words, the source IP address range can be specified as, for example, "0.0.0.0" (1341) through "255.255.255.255" (1342), or the entire range, and the source port 1343 is not specified. Similarly, the destination IP address range can also be specified as, for example, "0.0.0.0" (1344) through "255.255.255.255" (1345), or the entire range, and destination port 1346 is not specified.

In the process for edge policy rule 312, since the DSCP is, for example, "46", core policy table 1611 can be looked up through by using "46" as the key. In this case, although edge policy rule 311 has two conditions, only a single rule is generated since it provides metering action. Edge policy rule 312 has a metering condition, for example, "Information_rate<=1 Mbps" and an out-of-profile action, for example, "drop", so that these and the list of actions "Scheduling_algorithm=Priority", and "Queue_priority=6" that is obtained from core policy table 1611 can be combined, and written into the rule at address 332 of metering and scheduling policy 1316. More particularly, for information rate 1348, value, for example, "1000" can be written, and for the in-profile queue number, for example, "6" can be written and for the out-of-profile discarding action 1352, for example, "drop" can be written. In addition, element 1514 corresponding to interface No. 4 in the queue configuration table and the "PrioritySchedl" can be compared, but since these values match, nothing would occur.

In the process for edge policy rule 313, since the DSCP is, for example, "10", core policy table 1611 is looked up by using "10" as the key. In this case, edge policy rule 311 has two conditions and does not provide metering action, thus, two rules would be generated. The first rule corresponds to the first condition, and can be generated at address 364. The second rule corresponds to the second condition, and can be generated at the address 396. Since edge policy rule 314 includes neither the metering action nor out-of-profile action, the action of edge policy rule 314 would not be written to the rule at address 428, only a list of actions, such as, for example, "Scheduling_algorithm=Priority" and Queue_priority=5", that can be obtained from core policy table 1611 would be written thereto. In the rule at address 364, the source IP address of, for example, "192.168.7.2" that is obtained from the first condition of edge policy rule 313 is entered as the minimum and maximum source IP addresses 1341 and 1342, respectively. In a case of the rule at address 396, the source IP address of, for example, "192.168.7.4" obtained from the second condition of edge policy rule 313 can be entered as the minimum and maximum source IP addresses 1341 and 1342.

In the process for edge policy rule 314, since the DSCP can be, for example, "0", core policy table 1611 is looked up by using "0" as the key. When the DSCP is any value other than, for example, "10", "18" and "46", element 1804 can be returned as the result, so that the action included in element 1804 can be written to address 428 of metering and scheduling policy 1316. Since edge policy rule 314 includes neither a metering action nor out-of-profile action, the action of edge policy rule 314 would not be written to the rule at address 428.

In step 2042, a metering and scheduling policy rule can be generated from the metering action and out-of-profile action of the subject rule. If there is no core policy in the policies in FIG. 3, step 2042 can be executed to generate a rule with DSCP condition 1347 of, for example, "46" and information rate 1348 of, for example, "1000". In this rule, in-profile queue number 1349 would be left unwritten (e.g., left as a default value).

In the above policy conversion procedure 1603, whether the inputted policy can be converted was not tested. In order to implement this test, policy conversion procedure 1603 may be modified as follows. That is, first, if the conversion type is, for example, the "division type" or "division and fusion type", policy division is necessary. However, if the DSCP marked by the edge policy rule is being checked by any edge policy rule, in other words, if the marked DSCP appears in the condition part, the conversion may not be initiated, since the semantics of the policy that would result from the conversion would differ from the semantics of the policy before the conversion. Therefore, this condition can be checked in step 2032, and if the conversion is not applicable, an error message can be issued and the process can be terminated.

If the conversion type is, for example, the "fusion type" or "division and fusion type", policy fusion is necessary. However, if there is a case in which none of the rules are applied in the edge policy, the policy fusion is not applicable. Therefore, this condition can be tested immediately before step 2031, and if such a situation is detected, an error message can be issued and the process can be terminated. In the process of the policy in FIG. 3, rule 314 can be applied to all cases in which no other rule can be applied, so that there would be no error.

If the test result in step 2033 is false, the conversion type can be determined prior to step 2042 to see whether it is, for example, the "division type" or any other type. When the conversion type is not the "division type", the policy fusion is necessary, but if there is a rule that neither marks nor checks the DSCP, the policy fusion is not applicable. In this case, therefore, an error message can be issued and the process is terminated.

When the edge policy includes a rule having a plurality of conditions and a metering action, if none of the rules in the edge policy are applied, this rule cannot be converted. Also, when there is a rule that neither marks nor checks the DSCP, this rule cannot be converted. This is because a plurality of conditions should not be specified in one metering and scheduling policy rule. In this case, therefore, an error message can be issued and the process can be terminated.

In steps 2011, 2021 and 2031, the starting address of the generated command can be written into code field 1025 of the subject rule in low-level policy DB 813. In steps 2041 and 2042, the starting address of the generated command is written into code field 1025 of the subject rule in low-level policy DB 813.

How the conversion is performed in the an exemplary embodiment of the present invention will be explained with reference to FIG. 22. Edge policy 301 includes policy rules 311, 312, 313 and 314. Core policy 351 includes policy rules 363, 364, 365 and 366. Filtering policy 1315 includes policy rules 1331, 1332, 1333, 13334, 1335 and 1336. Metering and scheduling policy 1316 includes policy rules at addresses 300, 332, 364 and 428.

Among the above policy rules, policy rules 1332 and 1333 can be the ones generated from policy rule 312. Policy rules 1334 and 1335 can be the ones generated from the policy rule 313. Furthermore, the policy rules at addresses 364 and 396 can be the ones generated from policy rule 362. In these cases, a single policy rule can correspond to a plurality of policy rules included in one policy. Moreover, the policy rule at address 332 can also be generated from policy rule 312, so that in this case, one policy rule can correspond to policy rules in a plurality of policies. While policy rule 312 has a function of marking and metering, the marking function can be implemented in policy rules 1332 and 1333, and the metering function can be implemented in the policy rule at address 332. This specifies that edge policy 301 has been divided into a filtering policy 1315 and metering and scheduling policy 1316.

The policy rule at address 332 can be the one generated from policy rules 312 and 361. Policy rule 312 can have a function of metering, and policy rule 361 can have a function of scheduling and queue priority configuration, and all of these functions can be implemented in the policy rule at address 332. This specifies that edge policy 301 and core policy 351 have been fused to generate the metering and scheduling policy 1316.

In an exemplary embodiment of the present invention, since the correspondence relationship among policies can be complex, an explanation will be provided using a more simplified case with reference to FIG. 23. In FIG. 23(a), an edge policy 2301 can include a policy rule 2311, a filtering policy 2302 can include a policy rule 2312, and a metering and scheduling policy 2303 can include a policy rule 2313. Policy rule 2311 can have the functions of marking and metering, and among them, the marking function can be implemented in policy rule 2312, and the metering function can be implemented in policy rule 2313. That is, core policy 2301 can be divided into filtering policy 2302 and metering and scheduling policy 2303, and among the functions of marking and metering that can be represented by core policy 2301, the marking can be implemented in filtering policy 2302, and the metering can be implemented in metering and scheduling policy 2303.

In FIG. 23(b), an edge policy 2321 can include a policy rule 2331, a core policy 2322 can include a policy rule 2332, and a metering and scheduling policy 2323 can include a policy rule 2333. Policy rule 2331 can have a function of metering, policy rule 2332 can have a function of scheduling and queue priority configuration, and all of these functions can be implemented in policy rule 2333. That is, edge policy 2331 and core policy 2332 can be fused into the metering and scheduling policy 2323, and the function of metering represented by edge policy 2331 and the function of scheduling and queue priority configuration represented by core policy 2332 can be both implemented in metering and scheduling policy 2323.

In an exemplary embodiment of the present invention, it is assumed that, for example, router 125 can be capable of directly translating the commands sent from policy server 103. However, when an existing router is connected to the policy server, such a direct translation is not always possible. In an alternate exemplary embodiment of the present invention, instead of using, for example, router 125 in FIG. 8, a proxy 2101 and a router 2102 in FIG. 21 can be used. In this configuration, the following features, for example, are different from the configuration of FIG. 8. In proxy 2101, a queue configuration table 2116 and a low-level policy DB 2117 can be located in a main memory, on a hard disk, or in any electronic storage media, and the contents thereof can be equal to queue configuration table 814 and low-level policy DB 813. The command sending section 2111 can send the contents of queue configuration table 2116 and low-level policy DB 2117 to, for example, router 2102 by using a command language of router 2102. In router 2102, the data sent from the proxy 2101 can be stored in queue configuration table 814 and low-level policy DB 813. This configuration allows exemplary embodiments of the present invention to be applied to, for example, a router which is incapable of translating the commands sent from policy server 103, especially those routers that have already been installed.

According to exemplary embodiments of the present invention, there may be many cases in which conversions are not applicable, because if a DSCP is used more than once, the meaning of translated policies would be different than their original meanings. This problem can be solved, however, if any flow label other than the DSCP can be used to pass the information from a filtering policy rule to a metering and scheduling policy rule. As for such a flow label other than the DSCP, use of, for example, the flow label field of IPv6 (Internet Protocol version 6), or the label or EXP field of MPLS (Multi-Protocol Label Switching) may be contemplated. If such is intended only for the internal use within the router or the interface of the router, a virtual label (or virtual flow label) can also be used. A virtual flow label is a label attached to a packet or flow, and similar to a DSCP. However, a virtual flow label exists outside of the packet, and the number of different virtual flow labels is not restricted. A more detailed discussion on virtual flow labels can be found in, for example, "Two Rule-based Building-block Architectures for Policy-based Network Control", by Yasusi Kanada, $2^{nd}$ International Working Conference on Active Networks (IWAN 2000), October, 2000, the disclosure of which is incorporated herein by reference.

In an exemplary embodiment of the present invention for performing policy division, the third policy rule can define a virtual flow label value and the fourth policy rule can be associated with the virtual flow label value. In an exemplary embodiment of the present invention, the first policy can include at least a first policy rule having the first function, which can modify the contents of a field in each of a plurality of data packets, for example, the DSCP in each data packet, in the action part of the first policy rule, or having the first function, which can refer to the DSCP in each data packet, in the condition part of the first policy rule. The first policy can also include a second policy rule having the second function in an action part of the second policy rule. The second function can include a first reference to a value, for example, the DSCP, modified by the first function. The second policy can include at least a third policy rule having the first function and a virtual flow label value in an action part of the third policy rule and a fourth policy rule having the first reference, for example, to the DSCP, in a condition part of the fourth policy rule. The third policy can include at least a fifth policy rule having a reference to the virtual flow label value in a condition part of the fifth policy rule and having the second function.

In an exemplary embodiment of the present invention, the first policy can include at least a first policy rule having a first reference in a condition part of the first policy rule and a second policy rule having a second reference and having a second function in an action part of the second policy rule. The first reference can refer to the contents of a field in each of a plurality of data packets. The second reference can refer to a value of the field modified by the first function. The second policy can include at least a third policy rule having the first reference in a condition part of the third policy rule and a fourth policy rule having the second reference and a virtual flow label in a condition part of the fourth policy rule. The third policy can include at least a fifth policy rule having a reference to the virtual flow label in a condition part of the fifth policy rule and having the second function.

When the virtual flow label is supported in filtering policies and metering and scheduling policies, conversions can be performed with almost no constraint by using the following alternate exemplary embodiment of the present invention.

When a policy entered by an operator is specified with a virtual flow label, the referencing relationship of the virtual flow label can be analyzed in a similar manner as the DSCP by using, for example, "Virtual" instead of "DSCP" in label type field 1121 of the label reference table. Alternatively, by using, for example, "IPv6Label", "MPLS_Label" or "MPLS_EXP" as the label type, the flow label field of IPv6 or the label or EXP field of MPLS may be used.

In filtering policy 1315 (e.g., the second policy) and metering and scheduling policy 1316 (e.g., the third policy), a virtual flow label that appears in the condition and action parts can be handled by newly providing a virtual flow label condition field and a new virtual flow label field. An example of a policy that contains all the rules of FIG. 3 and that contains one of the following rules (e.g., the first policy) is considered here:

```
if (Source_IP is 192.168.6.* && Source_Port is 80) {
    If (Information_rate < = 1 Mbps) {
        DSCP = 18;
    } else {
        drop;
    }
}
or
if (Source_IP is 192.168.6.* && DSCP is 18 && Source_Port is 80) {
    if (Information_rate > 1 Mbps) {
        drop;
    }
}
```

The above first rule modifies the DSCP (e.g., the first function), and the above second rule refers to the DSCP (e.g., the first function). If this policy is converted according to exemplary embodiments of the present invention, an incorrect result may be obtained by applying the policies. This is because the rule in the scheduling policy rule (e.g., the third policy rule) derived from the above policy rule (e.g., the first policy rule) can be applied to part of a flow for which policy rule 311 should be applied in the application of the policies before the conversion. To solve this problem, in the transformation process of the above example policies, rule 1331 (e.g., the fourth policy rule) of filtering policy 1315 can be configured so as to mark, for example, "18 " as a virtual flow label as it checks for "18" as the DSCP, where "18" can be written into the new virtual flow label field.

In the rule (e.g., the fifth policy rule) at address 300 of metering and scheduling policy 1316 (e.g., the third policy), the virtual flow label values are checked for, for example, "18" (where "18" can be written into the virtual condition field) instead of checking the DSCP values.

In addition, the virtual flow label can be registered to core policy table 1611 instead of, or along with, the DSCP. That is, in each of the table elements, for example, "Virtual" can be entered as the type classification instead of "DSCP", and the same value as that of the DSCP can be entered. Alternatively, the flow label field of IPv6, or the label or EXP field of MPLS can also be used by entering, for example, "IPv6Label", "MPLS_Label" or "MPLS EXP" as the label type.

In step 2032 of policy conversion procedure 1603, the virtual flow label may be checked instead of the DSCP, and the virtual flow label may be looked up in core policy table 1611 instead of the DSCP. This reduces the number of cases in which conversions are inapplicable without causing to change the steps of policy conversion procedure 1603.

In an exemplary embodiment of the present invention, the policy server has been the one to determine the routers or interfaces to which a policy should be sent by using network configuration management table 212. However, in this method, a policy is not necessarily sent in the manner the operator intends. In order to solve this problem, in an alternate exemplary embodiment of the present invention, the policy server may be configured to allow the operator to explicitly specify the destination routers or interfaces so that the policy server can determine the destinations based on that specification.

In an exemplary embodiment of the present invention, since core policies can be distributed also to the interfaces connected to network edges, the policies are not necessarily sent in the manner the operator intends. In order to solve this problem without impairing the advantage of automatic deployment in which the operator does not have to specify the destinations, in an alternate exemplary embodiment of the present invention, the policy server can be configured to allow the operator to pre-register the ID information on the core and edge interfaces to the policy server 103, so that by referencing this ID information in step 703, it is possible to avoid sending core policies to the edge interfaces.

In an exemplary embodiment of the present invention, any rules specified with packet source IP addresses can be sent only to those interfaces on the input side of the edge routers. Accordingly, when the IP address of, for example, "192.168.7.3" of rule 312 is modified to, for example, "192.168.8.1", the modified rule could not be processed correctly. More particularly, these IP addresses are allocated to different interfaces of, for example, router 125. When this rule is sent to these interfaces, the primary semantics of rule 312 for metering a total value cannot be implemented since the metering of the information rate is processed for each individual interface.

In an alternate exemplary embodiment of the present invention, the process can be carried out correctly even in such a situation by modifying step 703 in the following manner. When a plurality of IP addresses appear in the condition part of a subject rule, and a plurality of interfaces of a single router are obtained as a result of a lookup conducted over network configuration management table 212, the subject rule is not sent to those interfaces, but sent to an interface 123 that is connected to the core network.

If the number of interfaces connected to the core network is only, for example, one, the metering would be performed correctly. The interface connected to the core network among other interfaces can be identified as follows. Since the interface connected to the core network would not appear on network configuration management table 212, an interface connected to the core network can be determined by using network configuration management table 212. However, to make the determination more explicitly, the operator can input a list of interfaces connected to the core network to the policy server 103 in advance, and store the list on a table for the later use.

In an exemplary embodiment of the present invention, the configuration processes are concentrated on the interface connected to the core network, resulting in increasing the load thereto. In order to solve this problem, in an alternate exemplary embodiment of the present invention, a rule with a plurality of IP addresses specified in the condition part can be divided into a first rule for conducting packet discarding and marking and a second rule for conducting metering and out-of-profile action, and sending the first rule to an edge interface and the second rule to the core interface. The division method is identical to policy conversion procedure 1603. When the IP address, for example, "192.168.7.3" in edge policy rule 312 is changed to, for example, "192.168.8.1", the following rules would be generated:

```
if (Source_IP is 192.168.7.1) {
    DSCP = 46;
}
if (Source_IP is 192.168.8.1) {
    DSCP = 46;
}
if (DSCP is 46) {
```

```
        if (Information_rate < = 1 Mbps) {
        } else {
            drop;
        }
    }
```

Or, when a virtual flow label ("VirtualLabel") is used in order to rescue the conversion-inapplicable cases, the following rules would be generated:

```
    if (Source_IP is 192.168.7.1) {
        DSCP = 46;
        VirtualLabel =46;
    }
    if (Source_IP is 192.168.8.1) {
        DSCP = 46;
        VirtualLabel = 46;
    }
    if (VirtualLabel is 46) {
        if (Information_rate < = 1 Mbps) {
        } else {
            drop;
        }
    }
```

In either case, the first rule can be sent to, for example, No. 4 edge interface 125 connected to the IP address of, for example, "192.168.7.1", and the second rule can be sent to, for example, No. 3 edge interface 124 connected to the IP address of, for example, "192.168.8.1", and the third rule is sent to, for example, No. 2 core interface 123. In this way, the metering can be performed in a specified manner in core interface 123, and at the same time, the load concentration to core interface 123 may be avoided.

In an exemplary embodiment of the present invention, policy server 103 could be an independent server since it manages a plurality of routers. However, in an alternate exemplary embodiment of the present invention, if policy server 103 manages only one router, policy server 103 may be embedded in router 101. In this alternate embodiment, policies can be sent from policy server 103 to router 101, not by means of communication, but via a storage medium such as a main memory, flash memory or disk, or any electronic storage media.

In an exemplary embodiment of the present invention, if edge policy 301 is applied, any of the policy rules should be applied. However, in a case that no policy rule may be applied, the conversion explained previously may not be correct. Where policy rule 314 does not exist, none of the rules in edge policy 301, but core policy rule 362, would be applied to those packets with DSCP, for example, "10" that are from source points other than the source IP addresses, for example, "192.168.7.2" and "192.168.7.4". In this case, however, since the converted rules at addresses 364 and 396 (FIG. 14) test for the source IP address, but not for the DSCP, no policy rules would be applied, generating an incorrect result. In order to avoid such situations, in an alternate exemplary embodiment of the present invention, the following method can be used. A policy rule for the action equivalent to that of core policy rule 362 can be generated separately from the rules at addresses 364 and 396. The same condition as core policy rule 362 can be used for this policy rule. In this way, the core policy would be adequately applied also to those packets to which none of the edge policy rules have been applied.

In an exemplary embodiment of the present invention, all of the policy rules in edge policy 301 serve to mark the DSCP. However, if there is a rule that does not mark or test a DSCP in a policy, then policy fusion is not possible in exemplary embodiments of the present invention. Such a rule can be called a loophole.

In an alternate exemplary embodiment of the present invention, the first policy can include at least a first policy rule and a second policy rule. The first policy rule can include a first condition in a condition part of the first policy rule and can include in an action part of the first policy rule a marking action of a first value of a field in each of a plurality of data packets. The second policy rule can include a second condition in a condition part of the second policy rule. The second policy can include at least a third policy rule having a condition part determining whether the field in each of the plurality of data packets includes the first value, and having in an action part of the third policy rule the first function. The third policy can include at least a fourth policy rule and a fifth policy rule. The fourth policy rule can include the first condition in a condition part of the fourth policy rule and the first function in an action part of the fourth policy rule. The fifth policy rule can include the second condition and a condition part for determining whether the field in each of the plurality of data packets contains the first value, and includes the first function in an action part of the fifth policy rule.

In an alternate exemplary embodiment of the present invention, if there is a policy rule that does not perform the marking, the following method may be used (assuming there is the following fifth policy rule immediately before policy rule 314):

```
    if (DSCP is 10) {
    }
```

The fifth policy rule would be applied to those packets with DSCP, for example, "10" sent from source points other than the source IP addresses, for example, "192.168.7.2" and "192.168.7.4" therefore core policy rule 362 should be applied thereto. In this case, however, since the converted rules at addresses 364 and 396 (FIG. 14) test for the source IP addresses, but not for the DSCP, no policy rules would be applied, generating an. incorrect result.

In order to avoid such situations, in an alternate exemplary embodiment of the present invention, the following method may be used. A policy rule for the action equivalent to that of core policy rule 362 can be generated separately from the rules at addresses 364 and 396. The same condition as core policy rule 362 can be used for this policy rule. In this way, the core policy would be adequately applied also to those packets to which the fifth policy rule has been applied.

The above embodiments have been explained with regard to the policy-based management of QoS. However, a method of the present invention can also be applicable when downloading rules providing other functions from a policy server to a network node, such as, for example, a router, an access node, etc. The method of the present invention can also be applicable to, for example: a rule for managing access or security; a rule for controlling switching and routing; a rule for converting information on the source and destination addresses of a flow contained in packets or addresses contained in payloads; a rule for performing calculation based on the information in payloads and writing the results to the payloads; and a rule for generating new packets by working upon a plurality of packets and inputting information contained in their payloads.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method for controlling a policy-based network, comprising the steps of:
    establishing a first policy within a policy server of the network, wherein the first policy includes at least a first function and a second function;
    converting the first policy into at least a second policy and a third policy, wherein the second policy defines a virtual flow label and the third policy is associated with the virtual flow label, and wherein the second policy is associated with the first function and the third policy is associated with the second function;
    distributing the second policy and the third policy within the network to at least one node; and
    controlling the at least one node using the second policy and the third policy.

2. The method of claim 1, wherein the first policy includes at least a first policy rule having the first function in the first policy rule and a second policy rule having the second function in the second policy rule, and
    wherein the second policy includes at least a third policy rule having the first function and defines the virtual flow label in the third policy rule, and
    wherein the third policy includes at least a fourth policy rule having the second function in the fourth policy rule, the fourth policy rule being associated with the virtual flow label.

3. The method of claim 1, wherein the first policy includes a list of condition parts of policy rules included in the first policy,
    wherein the second policy includes a list of condition parts of policy rules included in the second policy,
    wherein the third policy includes a list of condition parts of policy rules included in the third policy, and
    wherein the list of condition parts included in the first policy is equal to the list of condition parts included in the second policy and the list of condition parts included in the third policy.

4. The method of claim 1, wherein the first policy includes at least a first policy rule having at least a first condition and a second condition in a condition part of the first policy rule, wherein the first condition and the second condition are coupled with a logical "OR" operator,
    wherein the second policy includes at least a second policy rule having the first condition in a condition part of the second policy rule and a third policy rule having the second condition in a condition part of the third policy rule, and
    wherein the third policy includes at least a fourth policy rule having the first condition in a condition part of the fourth policy rule and a fifth policy rule having the second condition in a condition part of the fifth policy rule.

5. The method of claim 1, wherein the first policy includes at least a first policy rule having at least a first condition and a second condition in a condition part of the first policy rule, wherein the first condition and the second condition are coupled with a logical "OR" operator,
    wherein the second policy includes at least a second policy rule having the first condition in a condition part of the second policy rule and a third policy rule having the second condition in a condition part of the third policy rule, wherein the second policy rule includes, in an action part of the second policy rule, a marking action of a first value in a field in each of a plurality of data packets, wherein the third policy rule includes, in an action part of the third policy rule, a marking action of the first value in the field in each of the plurality of data packets, and
    wherein the third policy includes at least a fourth policy rule, and a condition part of the fourth policy rule determines whether the field in each of the plurality of data packets includes the first value.

6. A method for controlling a policy-based network, comprising the steps of:
    establishing a first policy within a policy server of the network, wherein the first policy includes at least a first function and a second function;
    converting the first policy into at least a second policy and a third policy, wherein the second policy is associated with the first function and the third policy is associated with the second function;
    distributing the second policy and the third policy within the network to at least one node; and
    controlling the at least one node using the second policy and the third policy, wherein the first policy includes at least a first policy rule having the first function in an action part of the first policy rule and a second policy rule having a first reference and having the second function in an action part of the second policy rule,
    wherein the first function modifies the contents of a field in each of a plurality of data packets,
    wherein the first reference refers to a value of the field modified by the first function,
    wherein the second policy includes at least a third policy rule having the first function and a virtual flow label value in an action part of the third policy rule and a fourth policy rule having the first reference in a condition part of the fourth policy rule, and
    wherein the third policy includes at least a fifth policy rule having a reference to the virtual flow label value in a condition part of the fifth policy rule and having the second function.

7. A method for controlling a policy-based network, comprising the steps of:
    establishing a first policy within a policy server of the network, wherein the first policy includes at least a first function and a second function;
    converting the first policy into at least a second policy and a third policy, wherein the second policy is associated with the first function and the third policy is associated with the second function;
    distributing the second policy and the third policy within the network to at least one node; and
    controlling the at least one node using the second policy and the third policy, wherein the first policy includes at least a first policy rule having a first reference in a condition part of the first policy rule and a second policy rule having a second reference and having a second function in an action part of the second policy rule, wherein the first reference refers to the contents of a field in each of a plurality of data packets, wherein the second reference refers to a value of the field modified by the first function, wherein the second policy includes at least a third policy rule having the first reference in a condition part of the third policy rule and a fourth policy rule having the second reference and a virtual flow label in a condition part of the fourth policy rule, and wherein the third policy includes at least a fifth policy rule having a reference to the virtual flow label in a condition part of the fifth policy rule and having the second function.

8. A method for controlling a policy-based network, comprising the steps of:

establishing a first policy within a policy server of the network, wherein the first policy includes at least a first function and a second function;

converting the first policy into at least a second policy and a third policy, wherein the second policy is associated with the first function and the third policy is associated with the second function;

distributing the second policy and the third policy within the network to at least one node; and controlling the at least one node using the second policy and the third policy, wherein the first policy includes at least a first policy rule having at least a first condition and a second condition in a condition part of the first policy rule, wherein the first condition and the second condition are coupled with a logical "OR" operator, wherein the second policy includes at least a second policy rule having the first condition in a condition part of the second policy rule and a third policy rule having the second condition in a condition part of the third policy rule, wherein the second policy rule and the third policy rule each define a first virtual flow label value, and wherein the third policy includes at least a fourth policy rule, and a condition part of the fourth policy rule determines the first virtual flow label value.

9. A method for controlling a policy-based network, comprising the steps of:

establishing at least a first policy and a second policy within a policy server of the network, wherein the first policy includes at least a first function and the second policy includes at least a second function, wherein the first policy defines a virtual flow label and the second policy is associated with the virtual flow label;

converting the first policy and the second policy into a third policy, wherein the third policy is associated with the first function and the second function;

distributing the third policy within the network to at least one node; and controlling the at least one node using the third policy.

10. The method of claim 9, wherein the first policy includes at least a first policy rule having the first function in an action part of the first policy rule, and wherein the second policy includes at least a second policy rule having the second function in an action part of the second policy rule, and wherein the third policy includes at least a third policy rule having the first function in an action part of the third policy rule and a fourth policy rule having the second function in an action part of the fourth policy rule.

11. The method of claim 9, wherein the first policy includes at least a first policy rule having a first condition in a condition part of the first policy rule and having in an action part of the first policy rule a marking action of a first value of a field in each of a plurality of data packets, wherein the second policy includes at least a second policy rule, a condition part of the second policy rule determining whether the field in each of the plurality of data packets contains the first value, and having the first function in an action part of the second policy rule, and wherein the third policy includes at least a third policy rule and a fourth policy rule, wherein the third policy rule includes the first condition in a condition part of the third policy rule and the first function in an action part of the third policy rule, and wherein the fourth policy rule includes a condition part for determining whether the field in each of the plurality of data packets contains the first value, and includes the first function in an action part of the fourth policy rule.

12. The method of claim 9, wherein the first policy includes at least a first policy rule and a second policy rule, wherein the first policy rule includes a first condition in a condition part of the first policy rule and includes in an action part of the first policy rule a marking action of a first value of a field in each of a plurality of data packets, wherein the second policy rule includes a second condition in a condition part of the second policy rule, wherein the second policy includes at least a third policy rule having a condition part determining whether the field in each of the plurality of data packets includes the first value, and having in an action part of the third policy rule the first function, and wherein the third policy includes at least a fourth policy rule and a fifth policy rule, wherein the fourth policy rule includes the first condition in a condition part of the fourth policy rule and the first function in an action part of the fourth policy rule, and wherein the fifth policy rule includes the second condition and a condition part for determining whether the field in each of the plurality of data packets contains the first value, and includes the first function in an action part of the fifth policy rule.

13. A system for controlling a policy-based network, comprising:

a policy server for establishing policies;

conversion means for converting at least one of a high-level policy into a plurality of low-level policies and a plurality of high-level policies into a low-level policy, wherein the high-level policies are based on virtual flow labels;

distributing means for distributing within the network at least one of the low-level policy and the plurality of low-level-policies;

a network node for receiving at least one of the low-level policy and the plurality of low-level-policies.

14. The system of claim 13, wherein the conversion means converts both the high-level policy into the plurality of low-level policies and the plurality of high-level policies into the low-level policy.

* * * * *